United States Patent
Peltier et al.

(12) 
(10) Patent No.: US 6,191,507 B1
(45) Date of Patent: Feb. 20, 2001

(54) MODULAR CONVEYOR SYSTEM HAVING MULTIPLE MOVING ELEMENTS UNDER INDEPENDENT CONTROL

(75) Inventors: Kenneth Peltier, deceased, late of Waterloo, by Laura H. Peltier, legal representative; Robert Gordon Lankin, Newton; Wayne Michael Robinson, Waterloo; David Kyle MacKay, Kitchener; Jeffrey John Fortuna, Ancaster; Sajeev Madusuthanan, Kitchener; Scott Charles Lindsay, New Hamburg; Michael A. Cybulski, Kitchener; Michael J. Hancock, Kitchener; Robert A. Holl, Kitchener; Donald J. Mowat, Ayr, all of (CA)

(73) Assignees: ATS Automation Tooling Systems Inc., Cambridge; Agile Systems Inc., Waterloo, both of (CA)

( * ) Notice: Under 35 U.S.C. 154(b), the term of this patent shall be extended for 0 days.

(21) Appl. No.: 09/403,982
(22) PCT Filed: May 1, 1998
(86) PCT No.: PCT/CA98/00447
  § 371 Date: Feb. 24, 2000
  § 102(e) Date: Feb. 24, 2000
(87) PCT Pub. No.: WO98/50760
  PCT Pub. Date: Nov. 12, 1998

(30) Foreign Application Priority Data

May 1, 1998 (US) .................................................. 60/045495

(51) Int. Cl.[7] .................................................... H02K 41/00
(52) U.S. Cl. ............................................. 310/12; 318/135
(58) Field of Search ................................. 310/12, 13, 14; 318/135

(56) References Cited

U.S. PATENT DOCUMENTS

| | | | |
|---|---|---|---|
| 4,698,996 | * | 10/1987 | Kreft et al. . |
| 4,841,869 | * | 6/1989 | Takeuchi et al. ..................... 104/292 |
| 5,023,495 | * | 6/1991 | Ohsaki et al. ......................... 310/12 |
| 5,606,256 | * | 2/1997 | Takei ............................... 318/135 X |
| 5,939,845 | * | 8/1999 | Hommes ................................. 318/6 |

* cited by examiner

Primary Examiner—Nestor Ramirez
Assistant Examiner—Judson H. Jones
(74) Attorney, Agent, or Firm—R. Craig Armstrong

(57) ABSTRACT

The modular conveyor system comprises N interconnected track sections, forming a continuous track, wherein each track section features a plurality of individually controlled coils stretching along the length thereof. Plural pallets, each having thrust producing magnets, travel independently alone the track. The track also comprises multiple linear encoder readers spaced at fixed positions therealong, and each pallet includes a linear encoder strip having a length R greater than the spacing E between the readers. Track section controllers associate the encoder strips with only one reader at any time in order to resolve the position of the pallets based on the fixed position of the readers and the relative positions of the strips in relation thereto. The section controllers also regulate and commutate the coils of the corresponding track sections in order to independently control each pallet. Communication links interface adjacent section controllers situated in adjacent track sections. The electromagnetic structure and distributed control architecture of the conveyor system enable it to independently control multiple practical pallets yet be constructed out of modular track sections, with little practical restriction on the length of the conveyor system or the number of pallets controlled thereby.

13 Claims, 16 Drawing Sheets

MODULAR CONVEYOR SYSTEM HAVING MULTIPLE MOVING ELEMENTS UNDER INDEPENDENT CONTROL

FIELD OF INVENTION

The invention generally relates to conveyor systems, and more specifically to conveyor systems in the form of modular linear motors having multiple moving elements under independent control.

BACKGROUND OF INVENTION

There are a number of fundamental limitations with well-known conventional conveyor systems which employ a belt for transporting pallets between processing stations. First, the speed of the belt is typically quite limited. This is largely due to the fact that the pallets are typically stopped, e.g., in order to be processed at a processing station, by mechanical stop mechanisms. Thus, if the belt conveyor is operated at a high speed, the strong impact between a pallet and mechanical stop is likely to jar whatever parts the pallet may be carrying for processing. Second, it is generally not possible to vary the acceleration and velocity profiles for individual pallets. For instance, if a first pallet is empty and a second pallet is loaded with delicate parts, it is generally not possible to aggressively accelerate the first pallet to a high speed while controlling the second pallet using more gentle acceleration and velocity profiles. This limitation affects the latency and possibly the throughput of the manufacturing line. Third, the belt conveyor is typically not bidirectional, which may result in a suboptimal design of the manufacturing line. Fourth, the belt conveyor typically provides limited flexibility or programmability, such as being able to very quickly change the positions of processing stations. Finally, the data acquisition capabilities provided by the belt conveyor are typically quite limited. For example, it is typically not possible to know where the pallets and their constituent loads are located along the conveyor at all times. Thus, for instance, it may be difficult to know how many pallets are queued at a particular processing station. For these and other reasons, a conveyor system having multiple moving elements or pallets under substantially independent control may be desirable for various types of applications.

Conveyor systems having multiple pallets under substantially independent control are known in the art, but suffer from a variety of limitations. For example, U.S. Pat. No. 4,841,869 issued Jun. 27, 1989 to Takeuchi et al. discloses a conveyor system utilizing a linear induction motor, comprising a conveyor cart and a guide rail for movably supporting the conveyor cart. The guide rail includes primary coils, and the conveyor cart includes a flexible secondary conductor extending longitudinally of the cart so as to follow the guide rail. The primary coils comprise a station primary coil disposed at each loading and unloading station for stopping and starting the conveyor cart, two primary coils adjacent opposite ends of the station primary coil for decelerating the conveyor cart that is to be stopped at the stat ion by the station primary coil and for accelerating the conveyor cart having started from the station to a target running speed, and a plurality of intermediate accelerating primary coils disposed between two adjacent stations for accelerating the conveyor cart to maintain the latter at the target running speed.

A major shortcoming with the Takeuchi et al. system is that the carts or pallets thereof cannot be positioned to stop at any point along the conveyor, but only where the linear motors thereof are disposed. This makes changing the location of a station a troublesome endeavour. In addition, the system is not capable of pinpointing the location of a moving pallet at any time. In view of these limitations, the Takeuchi et al. system does not feature truly independent and total control of multiple moving elements.

U.S. Pat. No. 5,023,495 issued Jun. 11, 1991 to Ohsaka et al. discloses a moving-magnet type linear d.c. brushless motor having plural moving elements disposed for motion along a track. The track includes a coreless stator armature having a plurality of contiguously arranged coils thereon. Each moving element includes a thrust-generating field magnet having P contiguous magnetic poles of alternating N and S polarity (i.e. polypolar magnet) having one side facing the stator armature. Each moving element may also include a polypolar position-detecting magnet. The track includes a row of position/commutation sensors, each row of position/commutation sensors being provided for detecting the magnetic poles of only the position-detecting magnet of a corresponding moving element. The position/commutation sensors are used in control circuitry for generating an electric current in the stator armature to move the moving elements in predetermined directions separately and independently.

The Ohsaka et al. system also has a number of shortcomings, particularly with respect to the modularity or scaling properties of the system. First, due to the fact that a separate track of position/commutation sensors is required for each moving element, the system can only accommodate a relatively small number of moving elements. Second, the length of the linear motor is limited by a servocontrol mechanism, described as a single microcomputer, which can only process and accommodate a limited number of the position/commutation sensors and associated electric current generating control circuitry. Third, use of the magnetic position-detecting elements provides a relatively poor resolution for measuring the position of the moving element. Fourth, the winding arrangement of the stator armature is essentially that of a linear stepper motor, which presents an uneven magnetic reluctance along the stator armature resulting in relatively noticeable cogging effects and a jerky thrust production. Finally, the, coreless design of the stator armature also results in a relatively low average thrust production which may not be suitable for typical conveyor system applications.

SUMMARY OF INVENTION

The invention seeks to avoid many of the limitations of the prior art in order to provide a conveyor system having multiple moving elements under independent control, and particularly such a conveyor system which can be constructed out of discrete, self-contained, modular track sections, with little practical restriction on the length of the conveyor system or the number of pallets controlled thereby.

One aspect of the invention relates to apparatus for detecting the positions of plural moving elements, such as pallets, relative to a stationary element, such as a track. This apparatus comprises a plurality of linear encoder readers spaced at fixed positions along the stationary element. A device, such as a reflective optical or magnetic strip, readable by the linear encoder readers is mounted on each moving element, with each readable device having a length which is greater than the spacing between any given pair of adjacent linear encoder readers. Guide means align the readable devices in order to interact with the linear encoder readers. Plural processing means, such as a digital signal processor connected to each linear encoder reader, associates any given readable device with only one linear encoder reader at any time and resolves the position of the corresponding moving element based on the fixed position of the associated linear encoder reader and a relative position of the given readable device in relation to the associated linear encoder reader.

Another aspect of the invention relates to a moving-magnet type linear motor, comprising a plurality of moving elements traveling along a track, and a stator armature provided substantially along the entire traveling track of moving elements. Each moving element travels separately and independently and comprises n permanent magnets disposed face to face with the stator armature, the magnets being arranged in alternating North and South sequence and having a pole pitch P. The stator armature comprises a plurality of individual coils arranged in a substantially contiguous sequence of individual polyphase-like sets, each set comprising p overlapping coils having centers thereof spaced apart by a distance P/p, where p>=2. A servocontrol system is provided for regulating and commutating the coils so as to produce a separate moving MMF for each moving element in order to independently control each moving element.

A further aspect of the invention relates to a modular linear motor, comprising:

n interconnected track sections, forming a continuous track, wherein each track section comprises a stator armature having a plurality of individually controllable coils disposed substantially along the entire length of the track section;

a plurality of moving elements traveling separately and independently along the continuous track, each moving element having at least two thrust producing magnets arranged in alternating North and South sequence and disposed face to face with the stator armatures of the track sections;

n track section controllers, one per track section, for regulating and commutating the coils of the corresponding stator armature in order to produce a separate moving MMF for each moving element located in the corresponding track section and independently control each moving element located therein; and communication means for interfacing the section controllers of adjacent track sections, wherein a given section controller is operative to utilize the communication means in order to transfer a servo responsibility for resolving the position of a given moving element to an adjacent section controller when the given moving element straddles the corresponding track sections, and wherein each of the given and adjacent section controller pair provides at least one coil regulating signal to the other of said pair in the event any portion of the magnets of the given moving element spans any portion of at least one coil situated in the track section corresponding to the other of said pair, provided that the responsibility for resolving the position of the given moving element has not yet been transferred to the other of said pair.

A still further aspect of the invention relates to a modular conveyor system, comprising:

n interconnected track sections, forming a continuous track, wherein each track section comprises a stator armature having a plurality of individually controlled coils disposed substantially along the entire length of the track section, and wherein each track section comprises a plurality of linear encoder readers spaced at fixed positions therealong;

a plurality of moving elements traveling separately and independently along the continuous track, each moving element having a plurality of thrust producing magnets arranged in alternating North and South sequence and disposed face to face with the stator armatures of the track sections, each moving element including a linear encoder strip having a length greater than the spacing between any given pair of adjacent linear encoder readers, the length of each moving element being sized to prevent linear encoder strips from adjacent moving elements to interact with the same linear encoder readers;

n track section controllers, one per track section, each section controller providing (a) position-detection processing means for associating any given linear encoder strip of any moving element located in the corresponding track section with only one linear encoder reader located therein at any time and for resolving the position of such moving element based on the fixed position of the associated linear encoder reader and a relative position of the given linear encoder strip in relation to the associated linear encoder reader, and (b) servo means, connected to the position-detection processing means, for regulating and commutating the coils of the corresponding stator armature in order to produce a separate moving MMF for each moving element located in the corresponding track section to thereby independently control each such moving element; and communication means for interfacing the section controllers of adjacent track sections, wherein a given section controller is operative to utilize the communication means in order to transfer a responsibility of resolving the position of a given moving element to an adjacent section controller when the given moving element straddles the corresponding track sections, and wherein each of the given and adjacent section controller pair provides at least one coil regulating signal to the other of said pair in the event any portion of the magnets of the given moving element spans any portion of at least one coil situated in the track section corresponding to the other of said pair, provided that the responsibility for resolving the position of the given moving element has not yet been transferred to the other of said pair.

In the preferred embodiment of the conveyor system, the magnets of each moving elements have a pole pitch P; the electrical pole pitch of each of the coils is P; and the coils of each track section stator armature are arranged in a substantially contiguous sequence of individual polyphase-like sets, each set comprising p overlapping coils having centers thereof spaced apart by a distance P/p, where p>=2, and where coils associated with one track section do not overlap onto an adjacent track section. This enables the track sections to be self contained and modular in nature.

In the preferred embodiment of the conveyor system, the transfer of the responsibility for resolving the position of a given moving element to an adjacent section controller when the given moving element straddles the corresponding track sections occurs when an aforesaid linear encoder strip is associated with a first linear encoder reader and simultaneously begins to interact with a second, adjacent linear encoder in a second, adjacent track section. The position-detection processing means of each section controller, in combination with the transfer between section controllers of the responsibility for detecting the position of moving elements which cross track sections, enables multiple elements to be tracked along the entirety of the track without requiring any further infrastructure, thereby not posing any undue limits on the number of moving elements which can be tracked. In addition, it will be appreciated that the moving elements are passive devices which, due to not being tethered in any way, have unrestricted mobility along the track.

In the preferred embodiment of the conveyor system, the section controllers are operative to transfer static data concerning the straddling moving element, such as its destination, to the adjacent section controller prior to the transfer of the responsibility for resolving the position of the straddling moving element. Furthermore, the section controllers are operative to transfer dynamic or memory based servocontrol data concerning the straddling moving element to the adjacent section controller substantially simultaneously with the transfer of the responsibility for resolving the position of the straddling moving element. In this manner, a distributed servocontrol system is presented which enables multiple moving elements to be controlled over a long track.

In the preferred embodiment of the conveyor system, the sections controllers are connected to a central controller which initializes the system and performs a diagnostic monitoring function. In addition, each section controller is directly connected to a station controller, such as a programming logic controller. The station controllers instruct the track section controllers for the purpose of carrying out station-specific tasks and coordinating the movement of the moving elements with other station machinery. The station controllers can also provide the section controllers with the next destinations for the moving elements, thereby alleviating the central controller from this task. The distributed control architecture provided by these additional components further enhance the scaling properties of the system.

BRIEF DESCRIPTION OF THE DRAWINGS

The foregoing and other aspects of the invention are discussed in greater detail below with reference to the drawings, provided for the purpose of description and not limitation, where like objects are referenced by like reference numbers, and wherein.

DETAILED DESCRIPTION OF PREFERRED EMBODIMENTS

Figure 1:
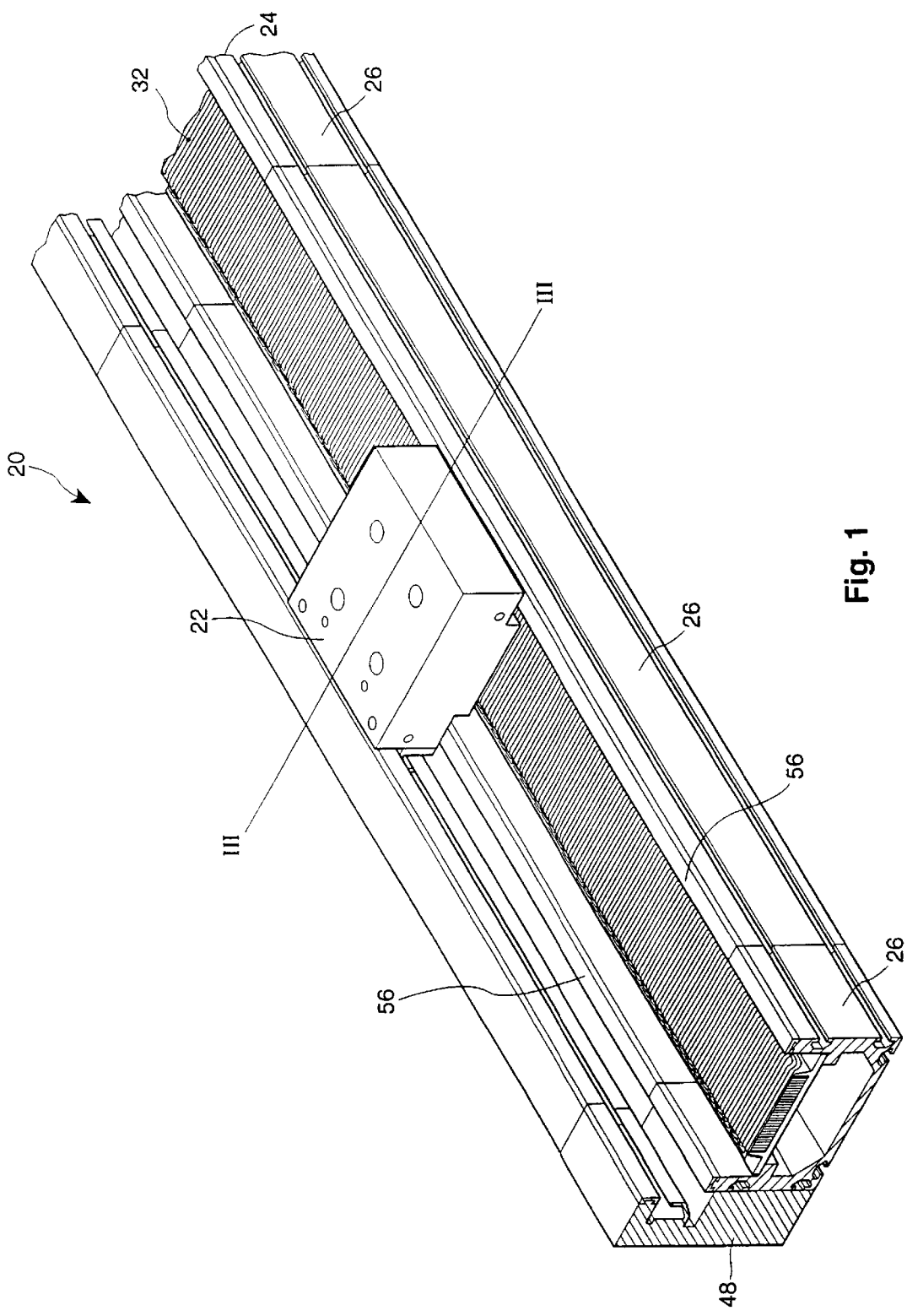
FIG. 1 is an isometric view of a portion of a modular conveyor system, in accordance with the preferred embodiment, wherein multiple pallets move over a track.

FIG. 1 illustrates a portion of a modular conveyor system 20, in accordance with the preferred embodiment. The system 20 features multiple pallets or moving elements 22 (only one is illustrated) which are constrained to ride or travel along a continuous, stationary, track 24.

The description of the conveyor system 20 is organized as follows: (1) an introduction to the operating principles thereof; (2) brief description of the physical structure of the system, which comprises a plurality of track sections or units 26; (3) description of the preferred electromagnetic structure of the system; (4) introduction to a preferred distributed control architecture for control of the system; (5) detailed description of a preferred servocontrol system for each track unit 26; (6) detailed description of a preferred servocontrol subsystem for detecting the position of each pallet 22 along each track unit 26; (7) detailed description of a method according to the preferred embodiment for synchronizing the servocontrol systems of adjacent track sections 26 when any given pallet 22 crosses therebetween.

Principle of Operation

Figure 2A:
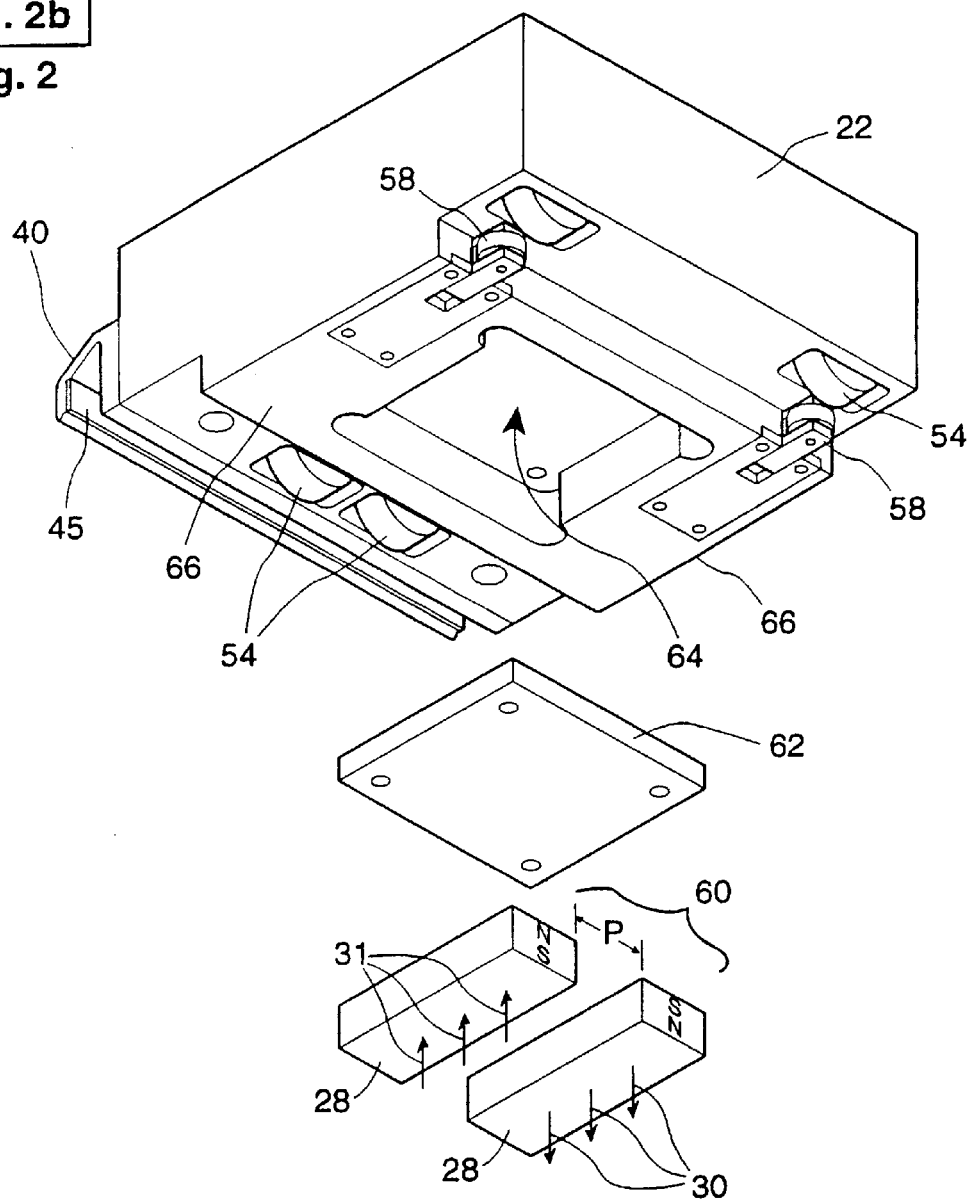
FIGS. 2a and 2b are exploded views of the system shown in FIG. 1.
Figure 2B:
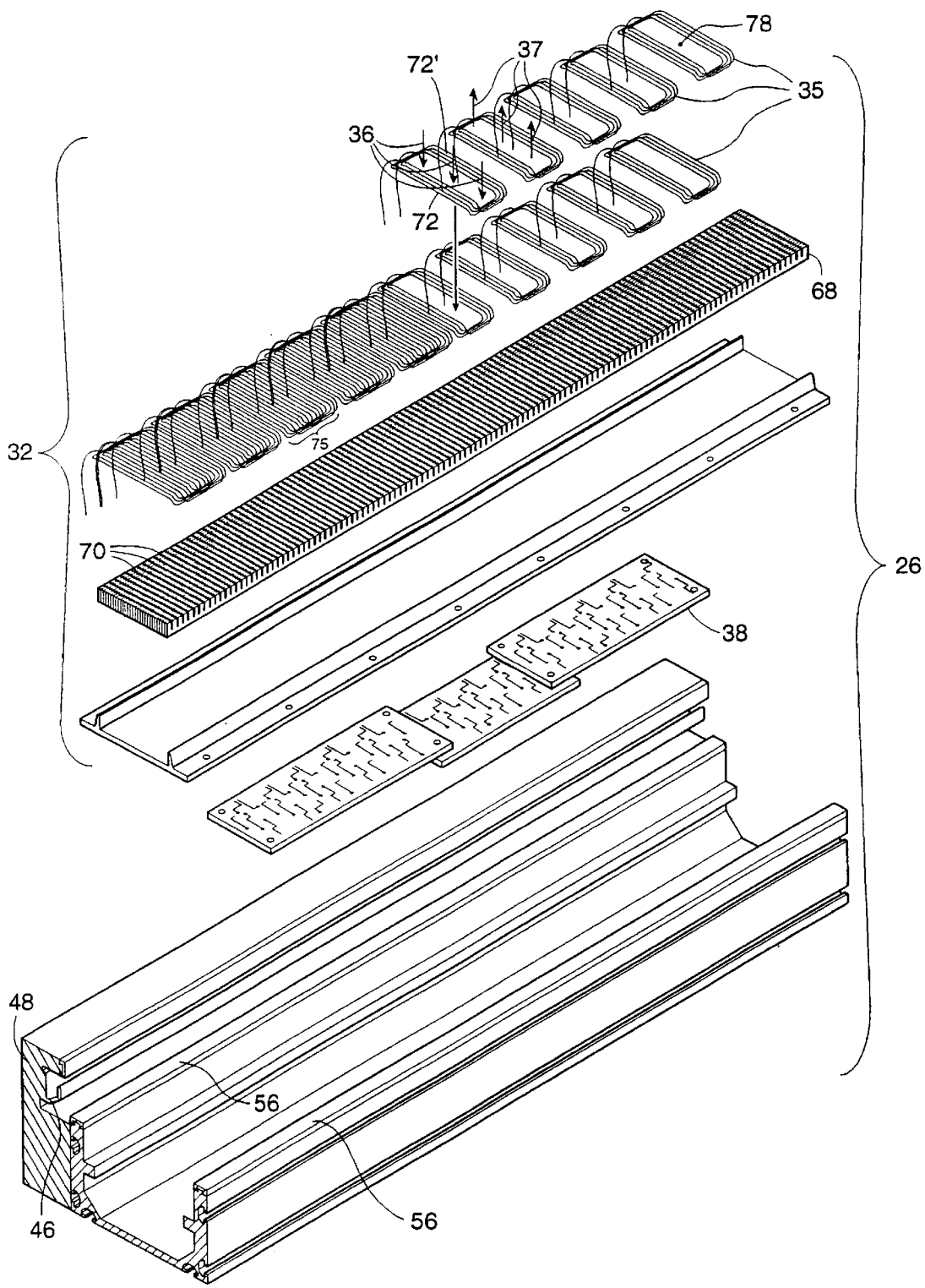
Figure 3:
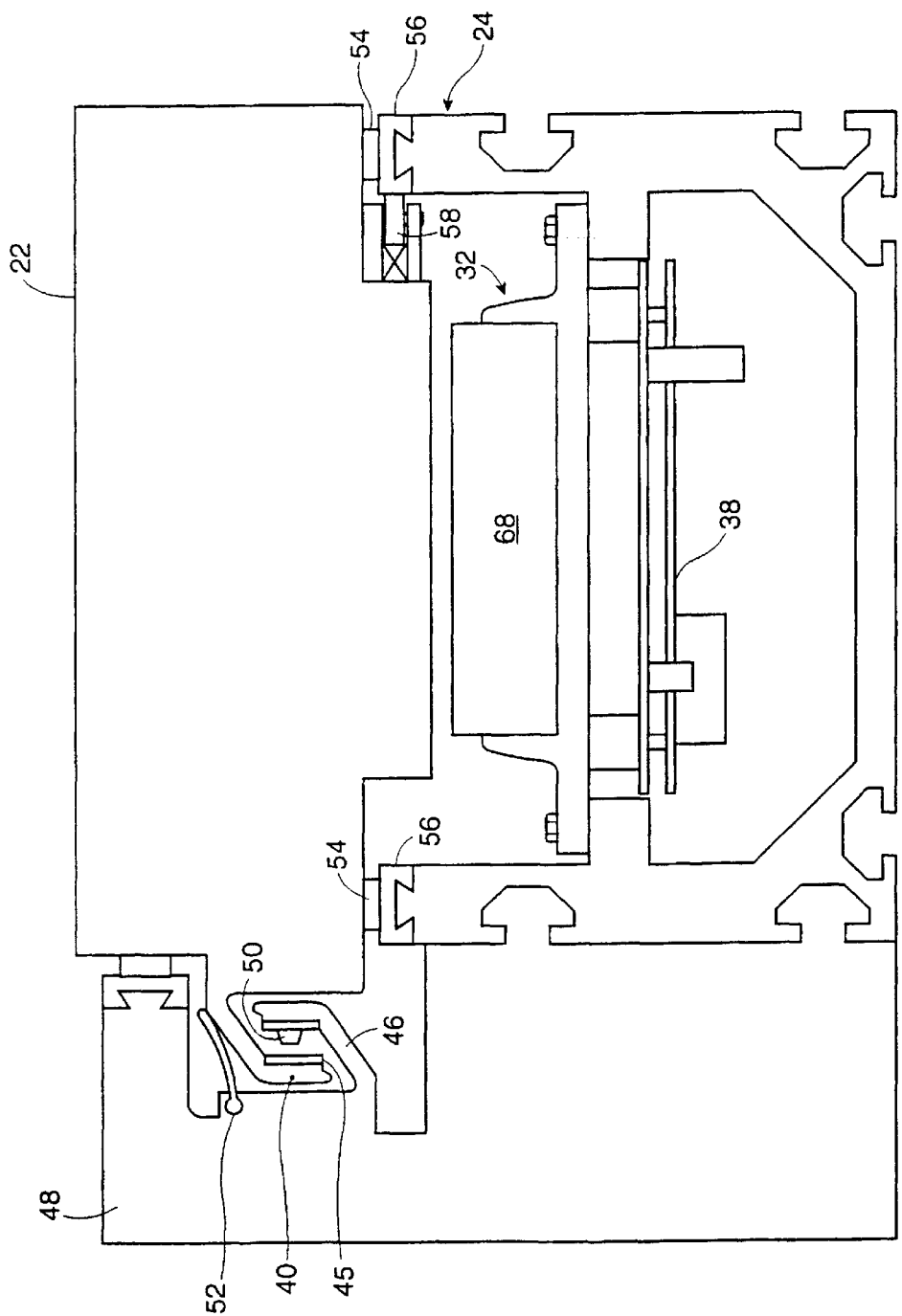
FIG. 3 is a cross-sectional view of the conveyor system taken along line III—III in FIG. 1.

Referring additionally to FIGS. 2 and 3, each pallet 22, as explained in greater detail below, houses a plurality of permanent magnets 28 disposed to provide a magnetic flux depicted by vectors (30 and 31) orientated normal to the track 24. The track 24, as explained in greater detail below, houses a stator armature 32 comprising a plurality of embedded coils 35 which are individually excited so that an electrically-induced magnetic flux (depicted by vectors 36 and 37) produced by the stator armature 32 is located only beneath a given pallet 22 to be controlled, in a direction normal thereto, without affecting adjacent pallets. The motive force for translating each pallet 22 arises from the magnetomotive (MMF) force produced by each pallet and the stator armature, i.e., by the tendency of the corresponding magnetic fluxes provided by the stator and pallet to align. Servocontrol means, as described in greater detail below, enable separate and independent moving MMFs to be produced along the length of the track 24 for each pallet so that each pallet 22 can be individually controlled with a trajectory profile that is independent of any other pallet. The servocontrol means employs a contactless pallet position-detecting subsystem, as described in greater detail below. Structurally, the conveyor 20 may thus be broadly classified as a moving-magnet type linear brushless motor having multiple moving elements.

Physical Structure

Mechanically, the track 24 is composed of a plurality of track sections or units 26 which are mechanically self-contained and quickly and easily separable from one another so as to be modular in nature. In the preferred embodiment, the track units 26 are mounted on a substrate (not shown) so as to merely align and abut one another in order to form the continuous track 24. This preferred feature requires that stator armature coils 35 from one track unit not overlap or project onto the stator armature of an adjacent track unit, as explained in greater detail below. Also, each track unit 26 houses all of the electronic circuitry 38 required to control the track unit.

As seen best in FIGS. 2 and 3, each pallet 22 includes an extension 40 onto which is mounted a relatively long, graduated, optically reflective strip 45. The extension 40 is disposed such that the reflective strip 45 interacts with contactless, optical linear encoder read heads 50 mounted to a corresponding extension 46 depending from a side wall 48 of the track 24. With the aid of flap 52, this interengaging structure protects the optical components 45 and 50 from the traffic on the track and assists in precluding ambient light, i.e., light interference or noise, from falsely triggering the optical linear encoder read heads 50. The optical components 45 and 50 are employed in the pallet position-detecting subsystem explained in greater detail below. At this point, it should be appreciated that by placing the read heads 50 on track 24 and not on pallets 22, the pallets are riot tethered in any way and thus their mobility is not restricted.

Each pallet 22 features load-bearing wheels 54 which ride along rails 56 of track 24. Each pallet also features spring-loaded bearings 58 for constraining the pallet to stay on the rails 56 and maintain the alignment bet ween optical components 45 and 50.

Electromagnetic Structure

The magnetic structure of each pallet 22 comprises at least two thrust-producing permanent magnets arranged in alternating North-South sequence. The permanent magnet material, which may include Neodymium-Iron-Boron, Alnico and ceramic (ferrite) base magnets, is selected on the basis of air gap flux densities required and the physical dimensions of the pallet magnetic structure. In the preferred embodiment, each pallet 22 carries two Neodymium-Iron-Boron permanent magnets 28 spaced apart by pole pitch P. This provides each pallet with a permanent magnet pole pair 60 which provides magnetic flux vectors 30 and 31 pointing in opposite directions. For reasons explained shortly below, and referring additionally to FIG. 5, the pole pitch P is preferably approximately equal to 2D/3, where D is the overall width of the permanent magnet poles pair, and the width, W, of each magnet 28 is preferably approximately D/3. The permanent magnet pole pair 60 abuts a magnetic backplate (FIG. 2) and these components are preferably mounted in a cavity 64 of pallet 22 such that end portions 66 of the pallet body function as dead poles which magnetically isolate the pallet permanent magnet pole pair 60 from the permanent magnet pole pair of any adjacent pallet.

The magnetic structure of the stator armature 32 comprises a yoke 68, constructed out of electrical steel, which features a plurality of substantially equidistantly spaced slots 70 disposed in relative close proximity to one another. A representative slot spacing is 3 mm and representative slot dimensions are 1.5×7×75 mm. The turns of the stator armature coils 35 are mounted in the yoke slots.

Figure 4:
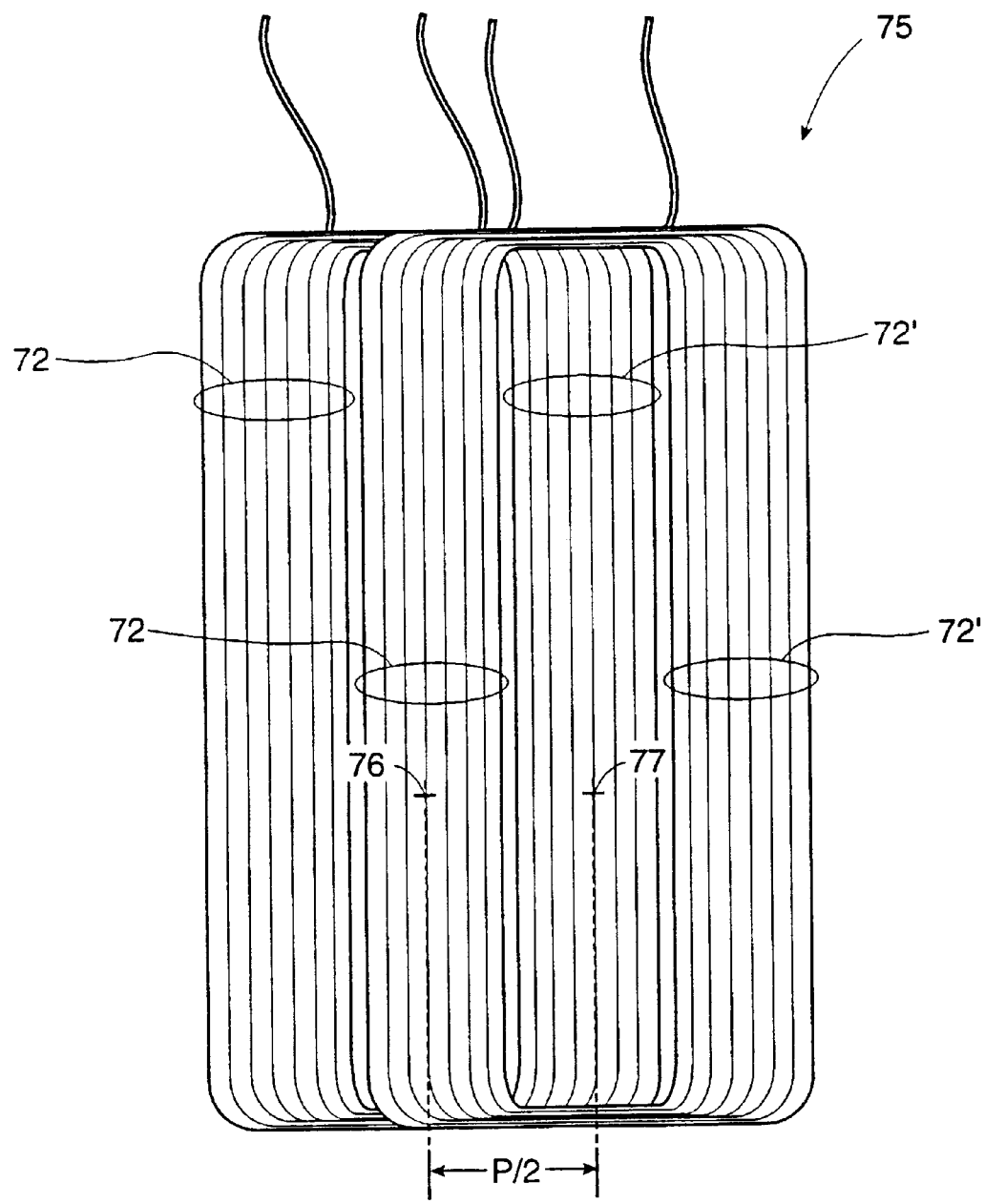
FIG. 4 is a plan view of an individual poly phase-like coil set employed in the conveyor system in accordance with the preferred embodiment.

The turns of each coil are formed (FIG. 4) into two legs 72 and 72' which are spatially distributed over a specified number of yoke slots 70. The coil legs 72 and 72' provide electrically induced, magnetic flux producing pole pairs that produce magnetic flux vectors 36 and 37 pointing in opposite directions. The spatial distribution of coil legs 72 or 72' reduces cogging effects caused by uneven reluctance and, in comparison to a non-spatially distributed coil leg or electrically induced pole, enables a smoother thrust production along the stator armature 32.

The electrical pole pitch (FIG. 5) of each coil 35 is substantially equal to the mechanical pole pitch, P, of each pallet permanent magnet pole pair 60. In the preferred embodiment, the width of each coil leg 72 or 72' is approximately equal to the width, W, of each pallet permanent magnet 28, whereby the overall width of each coil 35 approximately equals the overall width, D, of pal let permanent magnet pole pair 60.

The coils 35 are arranged as a sequence of individual polyphase-like windings or coil sets, wherein coils in each set are overlapped such that the coil centres are spaced apart a distance P/p, where p is the number of quasi-phases. The preferred embodiment, as seen in FIG. 2 and in FIG. 4 (which is a plan view of a coil set taken in isolation), features a two phase-like arrangement, wherein each polyphase-like winding or coil set (hereinafter "coil pair 75") comprises two overlapping coils 35 having their centres 76, 77 spaced apart by a distance P/2. Since the width, W, of the leg 72 or 72' of each coil 35 is D/3, and the width of the empty inner space of the coil is also D/3, it will be seen from FIGS. 2 and 4 that one of the legs 72 or 72' of each coil 35 in coil pair 75 substantially occupies the empty inner space 78 of the counterpart coil such that there are no unfilled yoke slots 70 spanned by the coil pair. In addition, the coil pairs 75 are arranged to be immediately adjacent to one another such that there are no unfilled yoke slots 70 in an inter-coil pair region. This arrangement, in combination with the spatial distribution of the turns of each coil leg, enables the stator armature 32 to present a relatively uniform reluctance in order to minimize cogging effects.

Another advantage provided by the individual polyphase-like windings or coil sets lies in the fact that the track 24 can be modularly constructed in discrete sections as described above such that no coil from one stator section overlaps, projects or otherwise encroaches upon an adjacent stator section. In contrast, a conventional convolute polyphase a.c. stator winding has an essentially endless coil overlapping arrangement such that turns cannot be mechanically separated.

In alternative embodiments, a coil set may comprise a short segment of a conventional polyphase a.c. winding, preferably provided that length of each segment is approximately equal to the length of the magnetic structure of the pallet. Thus, a stator armature according to this embodiment comprises a series of individually controlled polyphase a.c. windings.

The magnetic circuit provided by the pallet and stator armature is as follows (FIG. 2): the magnetic flux circulates through the pallet backplate 62, through the permanent magnets 28, across an air gap to and through the stator armature poles (i.e. coils 35), through the yoke 68, back through the stator poles, and back through the permanent magnets 28, returning to the pallet backplate 62.

Figure 5B:
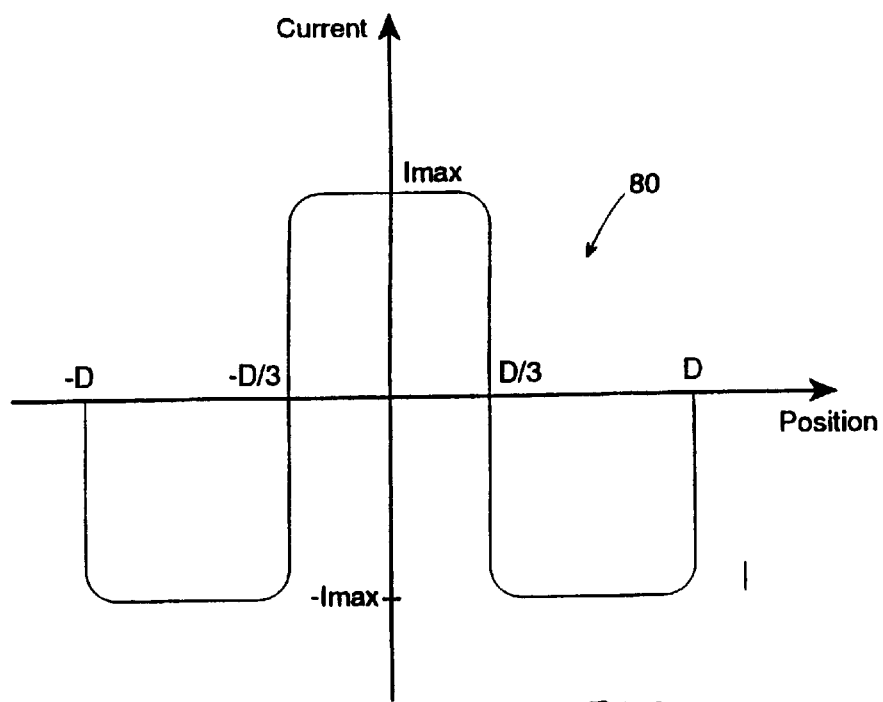
FIG. 5 depicts a conduction cycle of an individual coil shown in FIG. 4 in relation to the corresponding movement of a pallet thereover, in accordance with the preferred embodiment.
Figure 5A:
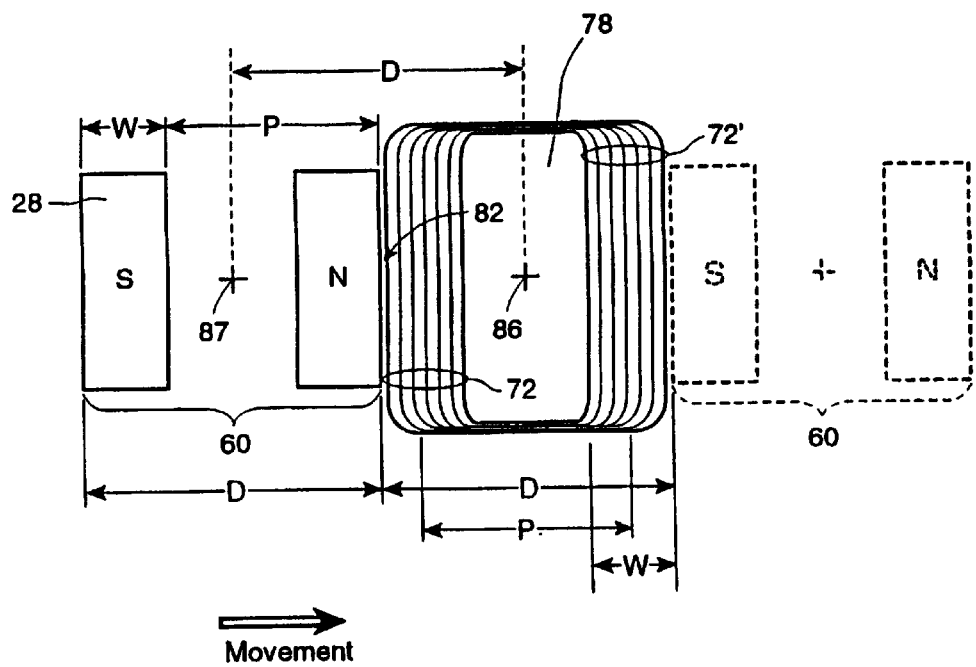

FIG. 5(b) illustrates a conduction cycle 80 for a single coil 35 of any given coil pair 75. FIG. 5(a) indicates that the conduction cycle 80 begins just as a leading edge 82 of pallet permanent magnet pole pair 60 (shown in solid lines) reaches a leading outer turn of the coil 35 and terminates just as a trailing edge 84 of the pallet pole pair 60 (shown in stippled lines) passes over a receding outer winding of the coil. Distances along the position axis of FIG. 5(b) correspond to the relative distance between a centre point 86 of coil 35 and a centre point 87 of the pallet pole pair 60. The conduction cycle 80 corresponds to a 540 degree electrical cycle. It should also be noted that the preferred conduction cycle illustrated in FIG. 5(b), in association with the design of the stator armature 32 as described above, yields a relatively constant MMF, having a ripple of only about 5–10%.

Distributed Control Architecture

Figure 6:
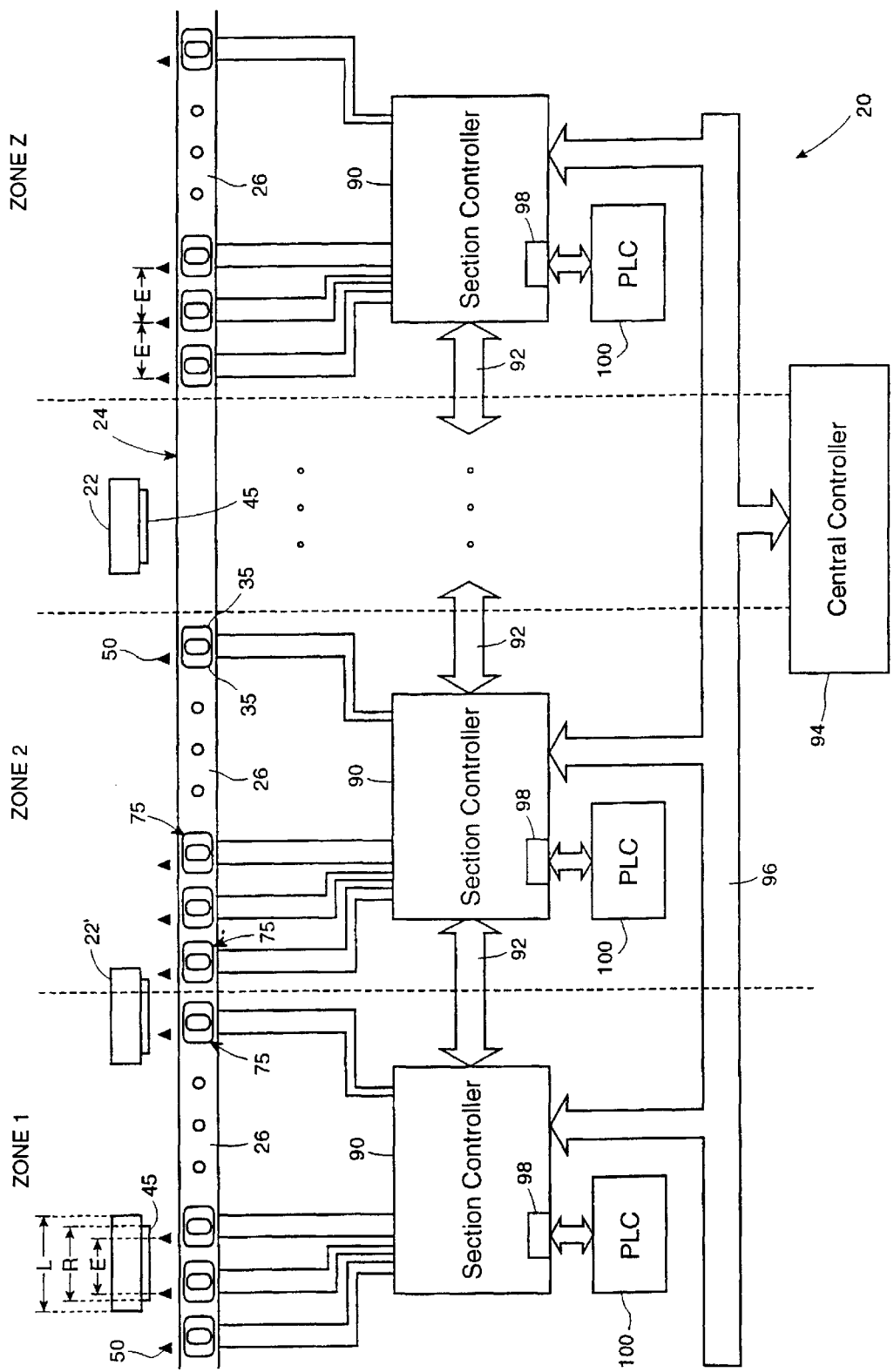
FIG. 6 is a system block diagram of a preferred distributed control architecture for controlling the conveyor system of FIG. 1 and each section thereof.

FIG. 6 is a high level abstraction of a preferred control architecture employed in the conveyor system 20. Architecturally, the conveyor system 20 is partitioned into a plurality of control zones, each of which corresponds to one track section unit 26, which is placed under the control of a local section controller 90. The section controllers 90 are connected to one another in a peer-to-peer communications network such that each section controller 90 is connected to a preceding and following section controller through high speed communications links 92.

Each section controller 90 is also connected to a central controller 94, such as a computer workstation, through a supervisory network employing a multi-drop bus 96. The central controller 94 and supervisory network provides an efficient means for initializing the section controllers. The central controller may also communicate destination data to the section controllers for the pallets (which are preferably uniquely addressed) and receive acknowledgement messages in return when pallets have reached their destinations. As such, the central controller may be used for process (i.e. manufacturing-line) control. The central controller also fulfils a supervisory diagnostic role by monitoring the section controllers (e.g., by engaging in a continuous polling process) in order to determine whether any section controller has failed.

Each section controller 90 may also (but does not necessarily) include a cell port 98 for interfacing section controller 90 to a e station controller such as an external programmable logic controller (PLC) 100. The PLCs provide manufacturing-line station-processing instructions to the track 24, such as directing the next destination for a pallet along the track, or providing station-specific motion instructions in respect of a given pallet stopped adjacent to or in a processing station (not shown). For instance, a typical two-axis station controller or PLC operates by providing pulse signals in order to synchronize the motion of a pallet along the track with the motion of a station end effector or dispenser moving along a transverse axis, whereby each pulse represents an incremental pallet move command. It will be appreciated that the provision of the station controller or PLC reduces the amount of bandwidth that would otherwise be required to communicate this information lo the central controller 94, thereby substantially eliminating a potential limitation on the length and processing capabilities of the conveyor system.

As illustrated, each section controller 90 is connected to all of the stator armature coils 35 in the corresponding track unit 26 and, as described in greater detail below, is responsible for commutating the coils in the control zone in accordance with an independent trajectory or "move" command for each pallet located therein. However, unlike a conventional convolute two phase stator armature winding, the commutation is complicated by the fact that a given pallet, (such as illustrated pallet 22') may straddle two coil pairs 75 whereby both coil pairs have to be simultaneously excited in order to produce a suitable moving MMF along the track 24.

Each section controller 90 is also connected to all of the optical read heads 50 situated in its control zone. The section controller is responsible for resolving the absolute position of each pallet 22 located in its control zone, as described in greater detail below.

Servocontrol System

Figure 7:
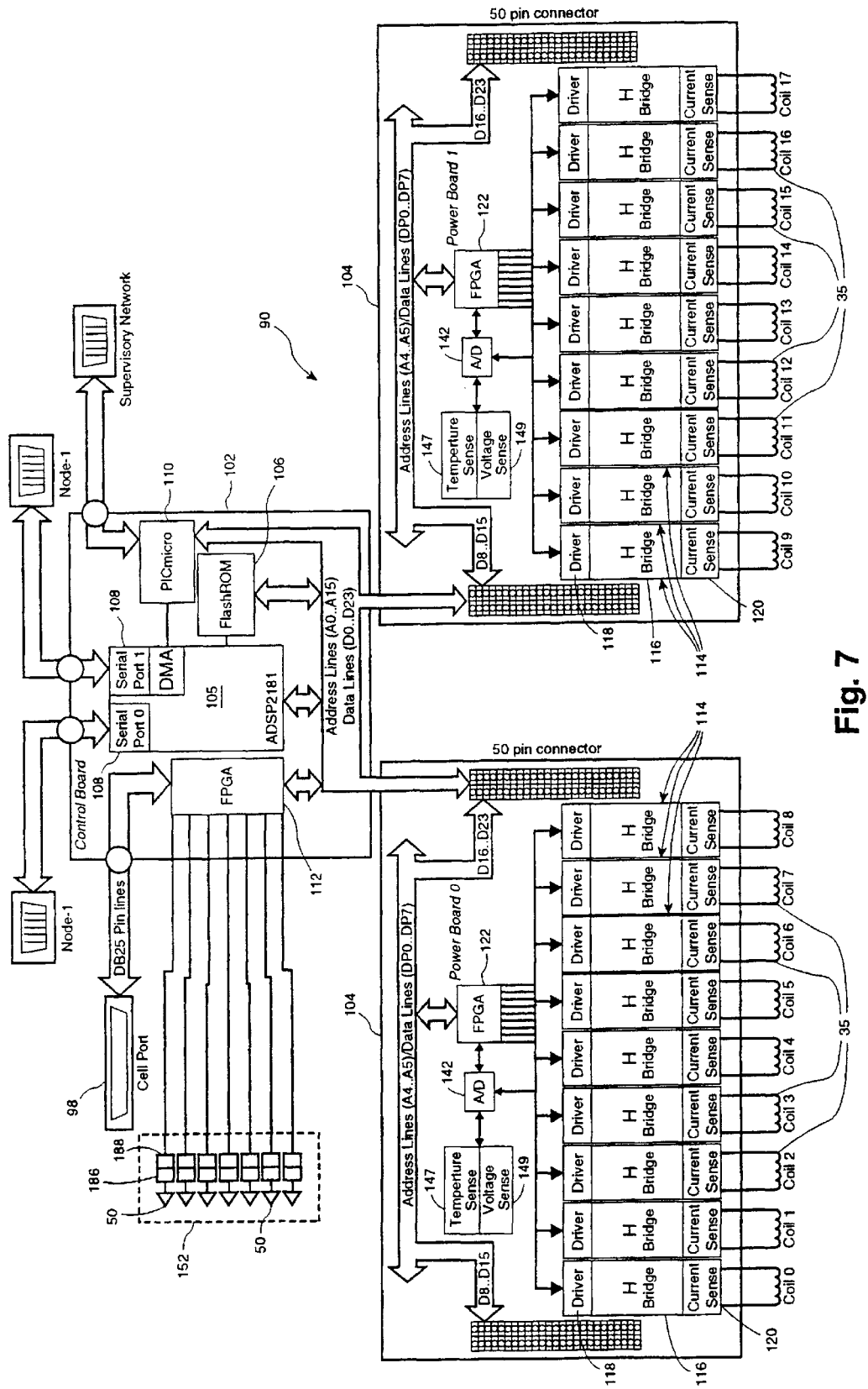
FIG. 7 is a hardware block diagram of preferred electronic circuitry used to control each conveyor system section shown in FIG. 6.

FIG. 7 is a hardware block diagram illustrating the major components of a given section controller 90 which, in accordance with the preferred embodiment, physically comprises a control board 102 and two power boards 104. The control board 102 includes an ADSP2181 digital signal processor (DSP) 105, commercially available from Advanced Micro Devices of Norwood, Mass. U.S.A., and associated program memory 106. The DSP 105 includes two on-chip serial ports 108 for providing the communication link interfaces 92 to adjacent preceding and following section controllers. A separate micro-controller 110 provides an interface to the supervisory network 96 which links the section controller 90 to the central controller 94. A field programmable gate array (FPGA) 112 is used to interface the cell port 98 with the local PLC 100. The FPGA 112 is also used to interface the optical read heads 50 with the DSP 105.

Figure 8:
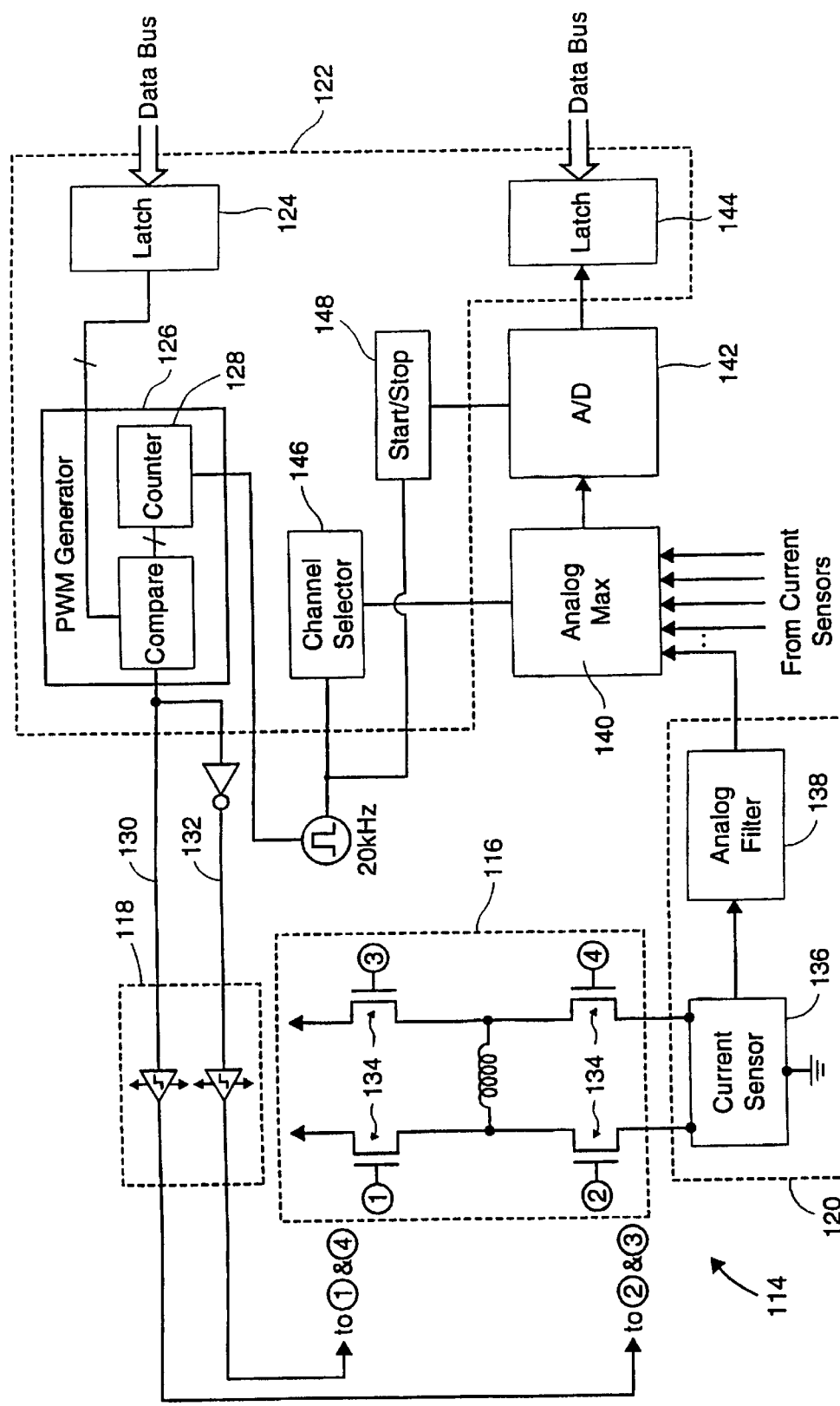
FIG. 8 is an electronic schematic diagram illustrating various portions of the electronic circuitry shown in FIG. 7 in greater detail.

The power boards 104 comprise a plurality of current amplifiers 114, one for each coil 35 controlled by the section controller. (There are eighteen coils in the illustrated embodiment.) Each current amplifier 114 comprises an inverter such as a two phase or H-bridge 116, drivers 118 for converting logic level signals to analog level signals in order to drive the power switches of the H-bridge, and current sensing circuitry 120 for sensing the coil current. Each power board also includes an FPGA 122 which is used to interface the DSP 105 with the current amplifiers 114. More particularly, as shown in FIG. 8 which illustrates a given current amplifier and its associated FPGA circuitry, the FPGA 122 provides a latch 124 (for each coil 35 controlled by a given power board), addressable by the DSP 105, for storing a pulse-width modulated (PWM) duty cycle value used to drive the H-bridge 116. The latch 124 is connected to a fixed frequency PWM generator 126 which operates by comparing the value stored in the latch 124 with a continuously cycling counter 128 and setting an output signal 130 accordingly. The output signal 130 and a complementary signal 132 are connected to the drivers 118 so as to control the base inputs of power MOSFET devices 134 employed as switching elements in the H-bridge 116.

The current sensing circuitry 120 comprises a current sensor 136 which is used to measure the current flowing through a given coil 35 for all commutation phases of the H-bridge. A suitable current sensor is disclosed for instance in co-pending U.S. Ser. No. 08/873,158, filed Jun. 11, 1997, by Derek C. Schuurman and assigned to an assignee of the instant application. A variety of alternative current sensing devices may be used, such as current transformers or open and closed loop Hall effect devices. The output of the current sensor 136 is connected to an analog filter 138 which is connected to an analog multiplexer 140 (not shown in FIG. 7). The analog multiplexer 140 multiplexes the current sensing signals from multiple current sensors associated with the other current amplifiers 114 located on the power board 104 and provides these signals to an analog to digital converter (A/D) 142 which is connected to a latch 144 addressable by the DSP 105. The FPGA 122 provides a channel selection means 146 for continuously sampling the current sensing signals from each current amplifier 114. The FPGA 122 also provides circuitry 148 for generating the appropriate control signals to the A/D 142. It will be noted (FIG. 7) that since each section controller 90 comprises two power boards 104 each carrying A/D 142, the DSP 105 can operate in a pipelined manner so that two coil current readings can occur substantially simultaneously.

Each power board 104 also includes a temperature sensor 147 and a voltage sensor 149 which are connected to the A/D 142 and interfaced to the DSP 105 by the FPGA 122, The central controller 94 periodically polls each section controller 90 in order to obtain diagnostics data provided by these sensors.

Figure 9:
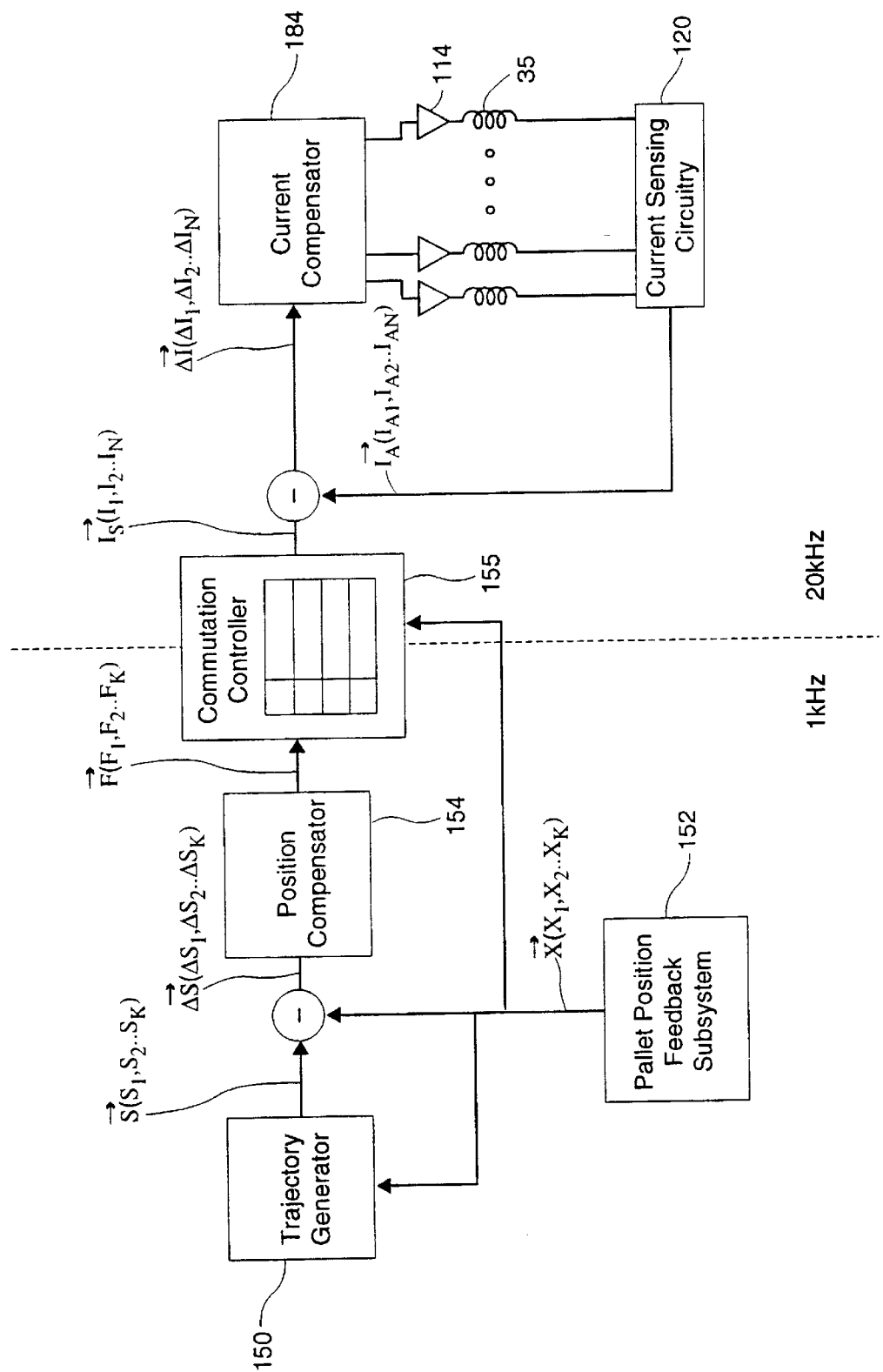
FIG. 9 is a system block diagram illustrating a servocontrol system according to the preferred embodiment for controlling pallets in each conveyor system section.

The DSP 105 of each section controller 90 is used to implement a closed-loop digital servocontrol system which is shown in systemic form in FIG. 9. The servocontrol system comprises a trajectory generator 150, as known in the art per se, for computing a pallet position set point vector $\vec{S}(S_1, S_2, \ldots, S_K)$, where component or signal represents the position set point for a given pallet located in the control zone serviced by the given section controller and K is the number of pallets in the control zone at any given time. The trajectory generator 150 produces set points for each pallet in accordance with pre-specified acceleration and velocity profiles for the pallets which are downloaded by the central controller 94 to the section controller 90 during system initialization. For example, the trajectory generator 150 may employ a trapezoidal acceleration profile to smoothly accelerate the pallet from an initial rest position to a terminal velocity and then smoothly de-accelerate the pallet to a destination position. In the preferred embodiment, the pallet position set point vector $\vec{S}$ is computed at a rate of approximately 1 KHz.

The pallet set points are compared against the measured positions, $\vec{X}(X_1, X_2, \ldots, X_K)$, of the pallets as determined by a pallet position feedback subsystem 152 which also samples pallet positions at a rate of approximately 1 KHz. This comparison results in the computation of a pallet position error vector $\Delta\vec{S}(\Delta S_1, \Delta S_2, \ldots, \Delta S_K)$. The pallet position error vector $\Delta\vec{S}$ is fed into a position compensator 154 which computes a force vector, $\vec{F}(F_1, F_2, \ldots, F_K)$, specifying the force required to be applied to each pallet in order to minimize the pallet position error. The force vector $\vec{F}$ is also computed at a rate of about 1 KHz.

Figure 10:
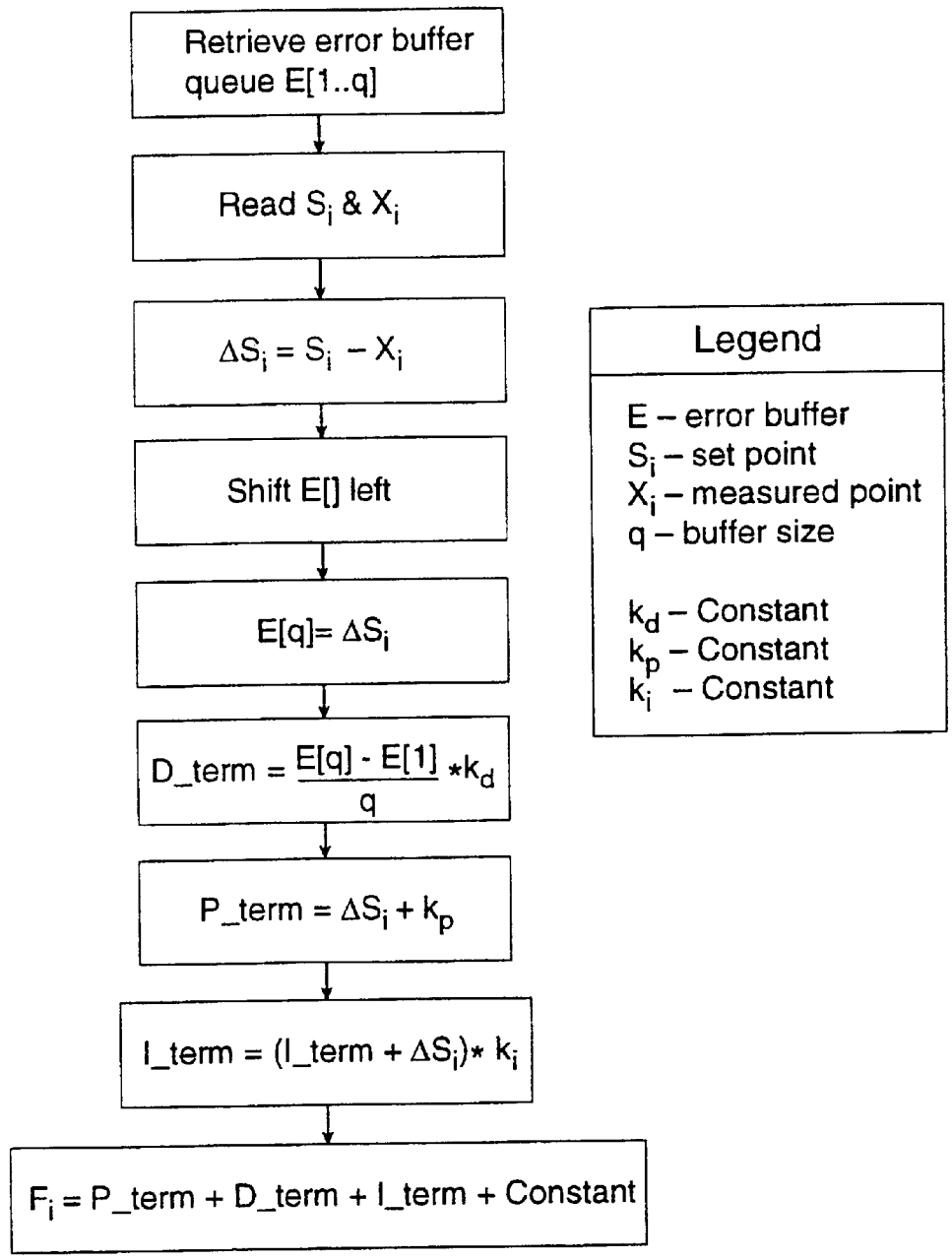
FIG. 10 is a flow chart of a digital p.i.d. position control loop employed in the servocontrol system of FIG. 9.

In the preferred embodiment, the position compensator 154 employs a well-known proportional, integral, derivative (p.i.d.) control law, however alternative control methods such as the state space technique may employed. FIG. 10 shows psuedocode for implementing a digital p.i.d. control loop in respect of one pallet. It will be seen that in order to compute a derivative term, D_term, of the p.i.d. control law, the p.i.d. control loop employs an error history buffer or array E[1 . . . q] for retaining a set $\{\Delta S_i[T], \Delta S_i[T-1], \Delta S_i[T-2], \ldots, \Delta S_i[T-q]\}$ of position errors where T represents a latest received pallet position error and q corresponds to the size of the buffer. In addition, the p.i.d. control loop employs an accumulator, I_term, for storing the integral term of the p.i.d. control law. This data assumes special significance when a pallet moves across control zones, as discussed in greater detail below.

Figure 11:
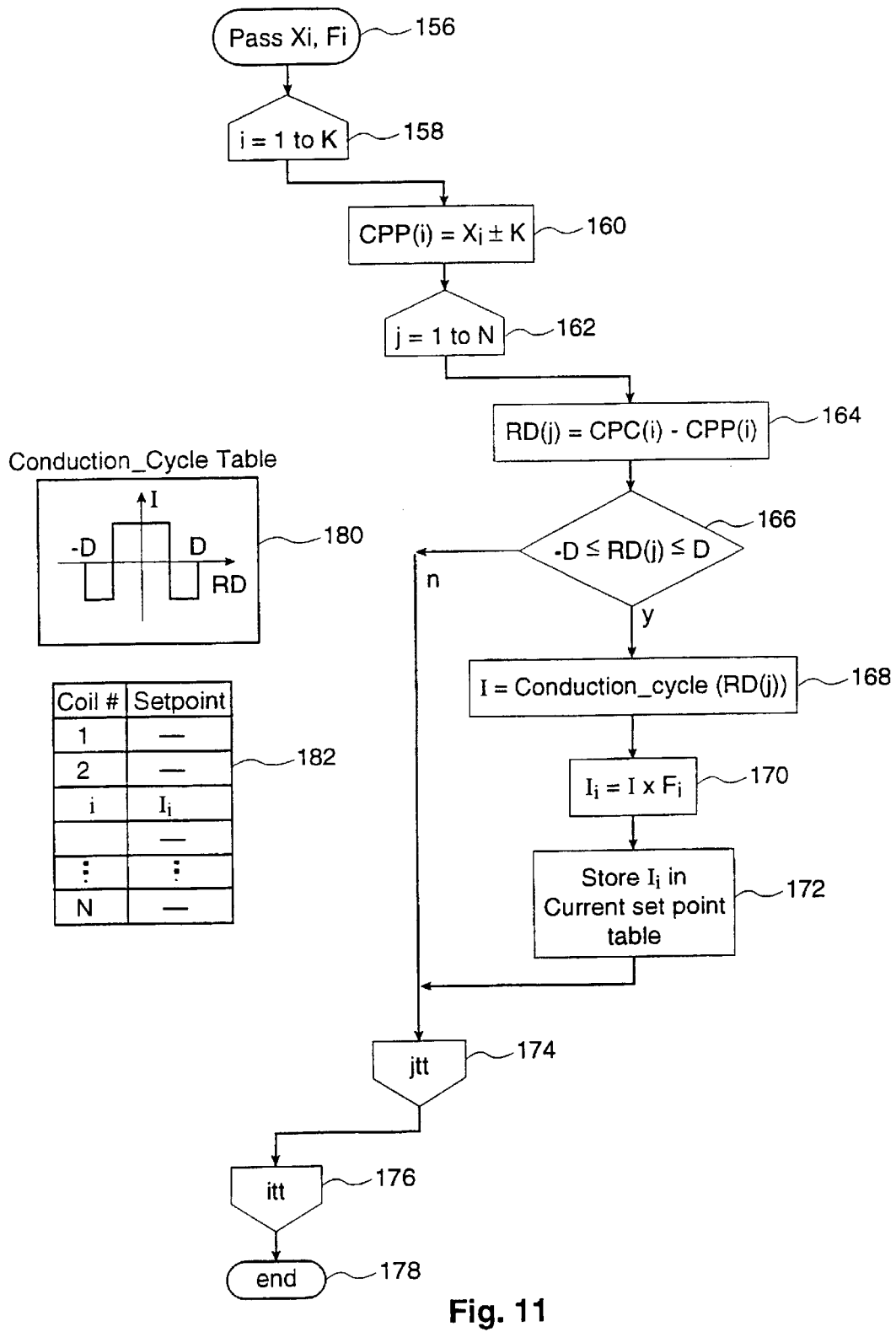
FIG. 11 is a flow chart relating to a commutation controller employed in the servocontrol system of FIG. 9.

The force vector $\vec{F}$ and pallet position vector $\vec{X}$ are fed (FIG. 9) into a commutation controller 155 which provides current set point data for the coils 35. FIG. 11 illustrates a preferred commutation control algorithm executed by the commutation controller 155. Processing steps 158 and 162 set up nested loops. The inner loop is executed N times, where N is the number of coils 35 controlled by section controller 90. The outer loop executes the inner loop K times, where K is the number of pallets presently located in the current control zone. At processing step 160 in the outer loop, the commutation controller 155 computes the centre point, CPP(i), of permanent magnet pole pair 60 for pallet(i), $1 < \leq K$. (See additionally FIG. 5). This computation is based on (a) input parameter or signal $X_i$, the measured position of pallet(i), which, as described in greater detail below, is measured at a different reference point than the pallet pole pair centre point 87; and (b) a constant which is dependent upon the physical dimensions of pallet(i). At processing step 164 in the inner loop (FIG. 11), the commutation controller 155 computes the relative distance, RD(j), between centre point CPP(i) of pallet(i) and the centre point, CPC(j), of a given coil, coil(j), $1 < j \leq N$. At step 166, a check is made whether or not $-D \leq RD(j) \leq D$. This, as described above with reference to FIG. 5, indicates whether or not the pole pair 60 of pallet(i) is situated above coil (j). If the pole pair 60 of pallet(i) is not situated above coil(j), flow control is passed to the next iteration of the inner loop. If the pole pair 60 of pallet(i) is situated above coil(j), then (FIG. 11) at steps 168, 170 and 172 the commutation controller respectively reads a table 180 corresponding to the conduction cycle 80 (FIG. 5) to extract a nominal current set point; scales the nominal current set point by input parameter $F_i$, the required force for pallet(i); and updates a current set point table 182. This process is repeated for each pallet in the control zone in order to provide a current set point vector $\vec{I}_S(I_{S1}, I_{S2}, I_{S3}, \ldots, I_{SN})$. The current set point vector $\vec{I}_S$ is computed or updated at a 20 KHz rate.

The current set point vector $\vec{I}_S$ is compared (FIG. 9) to an actual or measured coil current vector $\vec{I}_A(I_{A1}, I_{A2}, I_{A3}, \ldots, I_{AN})$ generated by the current sensing circuitry 120 in order to compute a current error vector $\Delta\vec{I}(\Delta I_1, \Delta I_2, \Delta I_3, \ldots, \Delta I_N)$ at a 20 KHz rate. The current error vector $\Delta\vec{I}$ is fed into a current compensator 184 which computes a PWM duty cycle value for each current amplifier 114 of each coil 35 using a proportional, integral (p.i.) control law well known in this art. In the foregoing manner, the commutation controller 155 applies the conduction cycle 80 to the necessary stator armature coils 35 in order to provide a moving MMF for a given pallet in the control zone, even when the pallet straddles two coil pairs 75.

Pallet Position Feedback Subsystem

Figure 12:
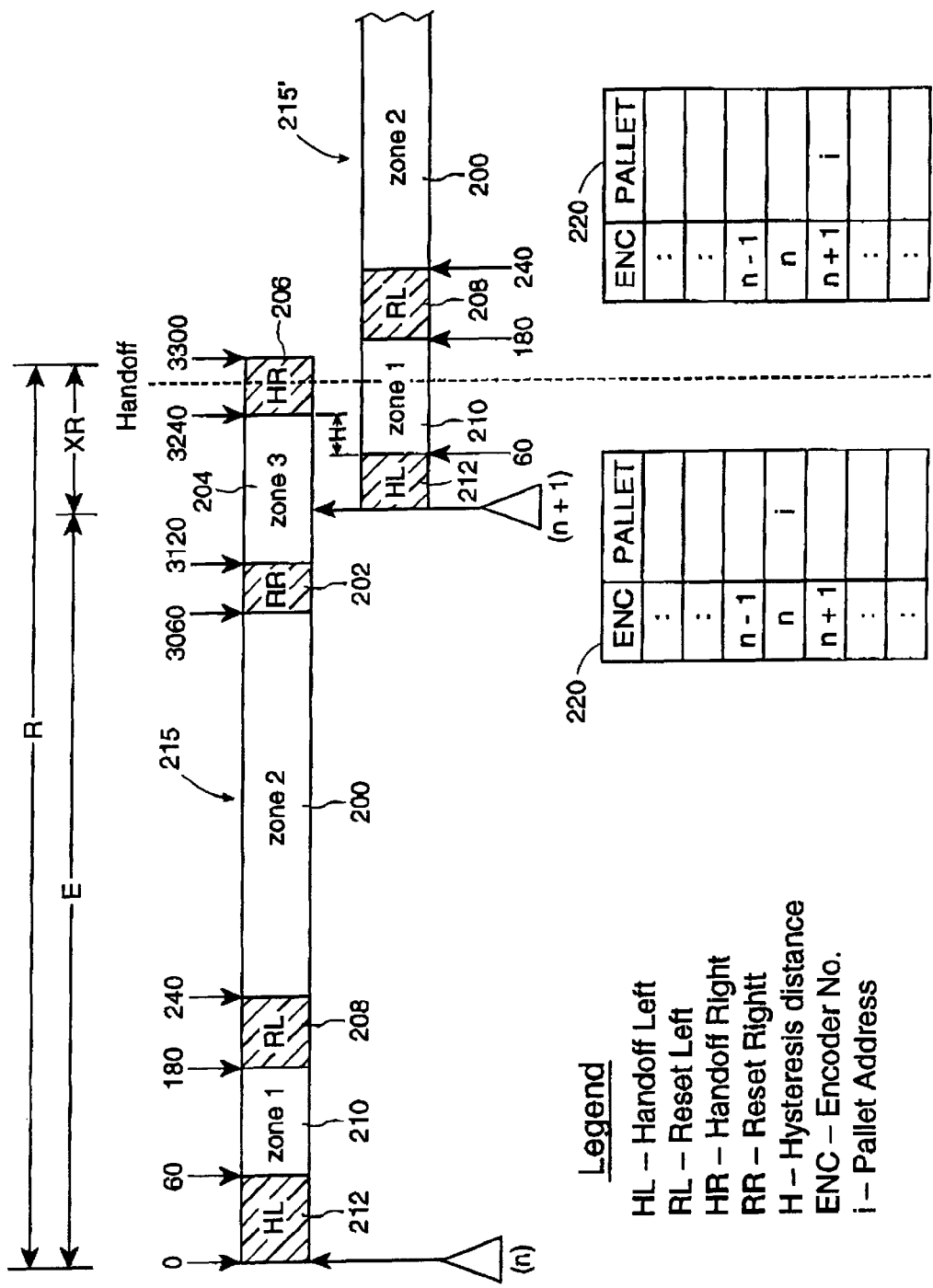
FIG. 12 is a diagram of a preferred scheme employed by the servocontrol system of FIG. 9 for demultiplexing linear encoders spaced along each conveyor system section in order to resolve the position of a given pallet therein.

The pallet position feedback subsystem 152 which supplies measured pallet position data to the trajectory generator 150, position compensator 154 and commutation controller 155 is now discussed in greater detail. Referring to FIGS. 6, 7 and 12, when the reflective strip 45 of a given pallet 22 moves over a given optical read head 50, two 90° out-of-phase signals are produced and quadrature decoding circuitry 186 causes a counter or register 188 associated therewith to count up or down in accordance with the direction of travel of the reflective strip 45. For example, if a 400 lines-per-inch graded reflective strip moves one inch through a given optical read head 50, such movement will cause the associated counter 188 to change by +/−400, depending on the direction of travel. The optical read head 50 and decoding circuitry 186 and 188 (hereinafter "encoder") as well as the associated reflective strip 45 are commercially available, for instance, from the Hewlett Packard Company of Santa Clara, Calif., U.S.A.

As depicted in FIG. 6, each control zone features a plurality, M, of the optical read heads 50 which are substantially equidistantly spaced at a distance, E, along every track unit 26. The length, R, of the reflective strip 45 is such that R is greater than E by a pre-determined amount, XR. Thus, the reflective strip associated with any given pallet can engage or trigger two encoders simultaneously at various points along the track. In addition, the length, L, of the pallet itself is at least equal to or greater than R in order to ensure that a reflective strip associated with an adjacent pallet does not interfere with the given pallet. In other words, the length L is chosen to ensure that no two reflective strips can trigger the same encoder.

As shown in FIG. 7, the FPGA 112 of each section controller 90 interfaces the linear encoders with the DSP 105 thereof. The DSP provides a parallel processing means for sampling the encoders and resolving the position of each pallet located in the associated track unit at a rate of approximately 1 KHz. Broadly speaking, the processing means associates the reflective strip 45 of any given pallet with only one encoder at any time so that the absolute position of the given pallet can be calculated based on a fixed position of the associated encoder (or more specifically its read head 50) and a relative position of the reflective strip in relation to the associated encoder. In addition, when the reflective strip simultaneously engages two encoders, at some point, as described in greater detail below, the processing means transfers or hands-off the association or "ownership" of the pallet from the current encoder to the adjacent engaged encoder. In this manner, the position of a given pallet can be continuously tracked across the control zone. When a pallet crosses control zones, a similar process occurs, with the addition that the adjacent section controller creates a data structure to keep track of the position of the given pallet, and at some point as described in greater detail below, once the hand-off is completed, the data structure for the pallet in the (now) previous control zone is deleted.

Figure 13:
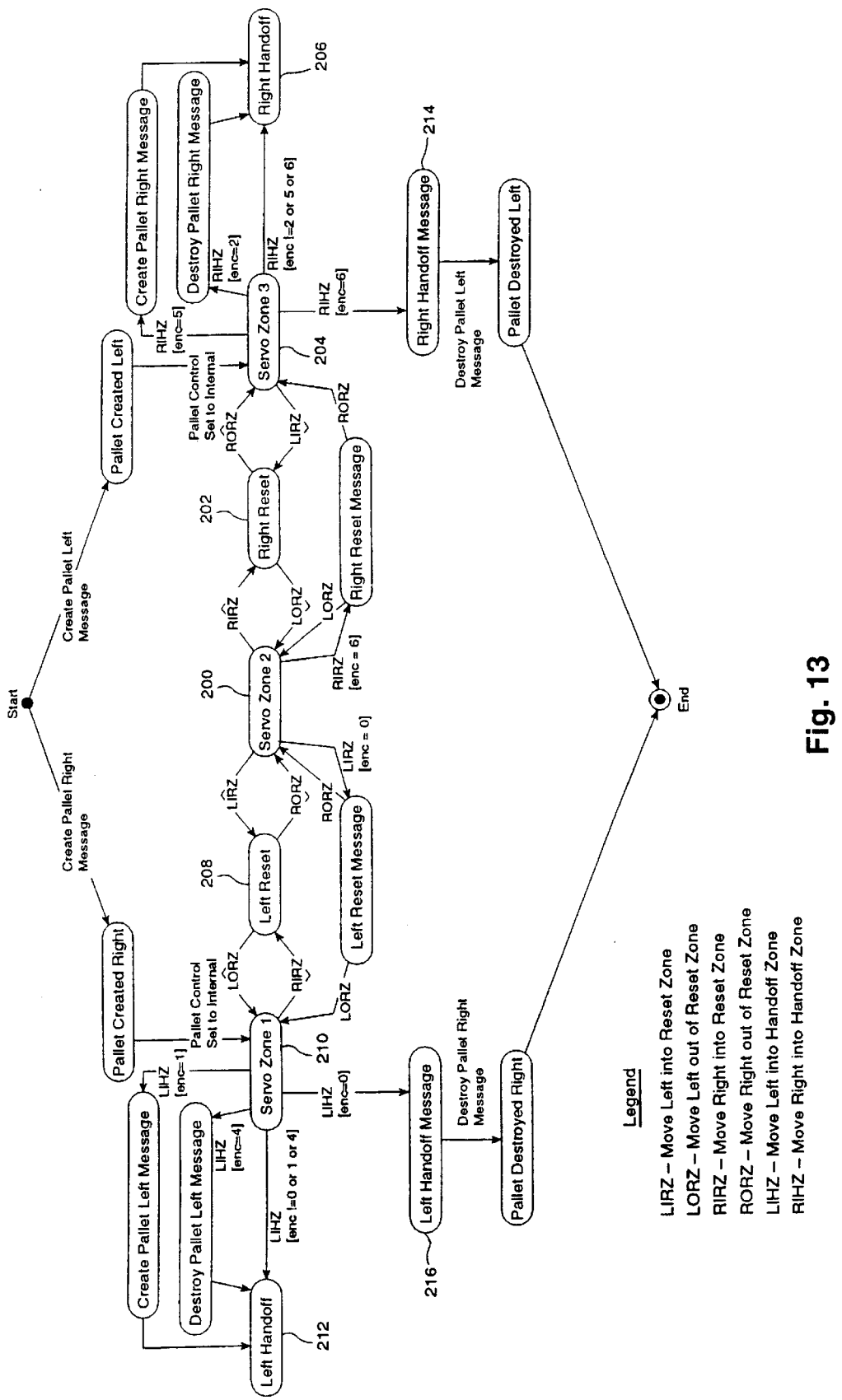
FIG. 13 is a state transition diagram in relation to the demultiplexing scheme of FIG. 12.

FIGS. 12 and 13 depict a method according to the preferred embodiment for accomplishing the hand-off or transfer of the ownership of a given pallet between adjacent encoders. More particularly, FIG. 12 depicts how a given encoder may assume various control states, and FIG. 13 is a diagram of an associated state transition table. In the illustrated embodiment, the reflective strip 45 features 3300 graduations, i.e. 3300 counts from start to finish, and a control zone features seven encoders (addressed from enc=0 to enc=6).

A "zone 2" state 200 represents a steady state condition wherein the reflective strip of a given pallet i engages a given encoder, encoder(n), and is not yet near encoder(n−1) or encoder(n+1). Considering the situation where the given pallet moves to the right in FIG. 12, at some point (i.e. when count=3060) the leading right edge of the associated reflective strip moves right into a "right-reset" state 202 where the adjacent right encoder(n+1) is continuously reset to zero in preparation for the hand-off. The reflective strip then enters a "zone 3" state 204 (at count=3120). At some point in this state, the leading edge of the reflective strip engages encoder (n+1) which begins its count reflecting the distance the leading edge of the reflective strip has passed therethrough. However, encoder(n) still owns the given pallet. The ownership continues until the leading edge of the reflective strip reaches a "right hand-off" state 206 (at count=3240). Somewhere in this state, depending on the rate the DSP 105 samples the encoders, the ownership of the given pallet is handed-off to encoder(n+1). The transfer of ownership is shown in the changing state of table 220 (FIG. 12) before and after the hand-off (where i represents the given pallet).

A similar process occurs when the given pallet moves leftward. "Reset-left", "zone 1", and "left hand-off" states 208, 210 and 212 are the respective counterparts to the "reset-right", "zone 3", and "right hand-off" states 202, 204 and 206.

The preferred method provides a hysteresis effect when the given pallet backtracks soon after the hand-off is accomplished. The extra distance XR by which the length R of each reflective strip exceeds the encoder spacing E enables the control state patterns 215 and 215' (FIG. 12) associated with each encoder to overlap and be partially temporally conterminous, as illustrated. The relative lengths and positions of the control states or zones are selected such that when the hand-off is effected, encoder(n+1) is in the "zone 1" control state 210. If during this state the given pallet backtracks, it must traverse at least a minimum hysteresis distance H backwards before the ownership of the given pallet is transferred back to encoder(n). The hysteresis effect provides for a more stable pallet position feedback system by preventing the oscillation or flip-flopping of hand-offs when a pallet straddles two encoders and is commanded to move relatively small distances to and fro. Such a condition could occur, for instance, when the pallet is located at a processing station and the motion of the pallet along the axis of track 24 is coordinated by the PLC 100 with the motion of a station end effector or dispenser moving along a transverse axis.

The preferred method is carried out by each section controller 90 for each pallet located in the corresponding control zone.

Those skilled in the art will appreciate that devices other than the optical linear encoder reader 50 and the reflective strip 45 may be used in alternative embodiments. For example, the passive readable device can be a magnetic strip and the linear encoder readers can be corresponding magnetic detectors. Such an alternative embodiment could provide very fine resolution, e.g. graduations of about a micron, however the cost of such linear encoders is typically very high and may not be required for most applications given the good resolution, typically a thousandth of inch, provided by the optically reflective strips.

Synchronizing Servocontrol Systems

The length of track 24 that a given section controller 90 can control is limited by various practical considerations, thereby complicating the production of moving MMFs for the pallets, which have to cross control zones. Accordingly, the preferred embodiment provides a means for synchronizing the servocontrol systems of adjacent section controllers and for passing control of a pallet crossing therebetween.

Figure 14:
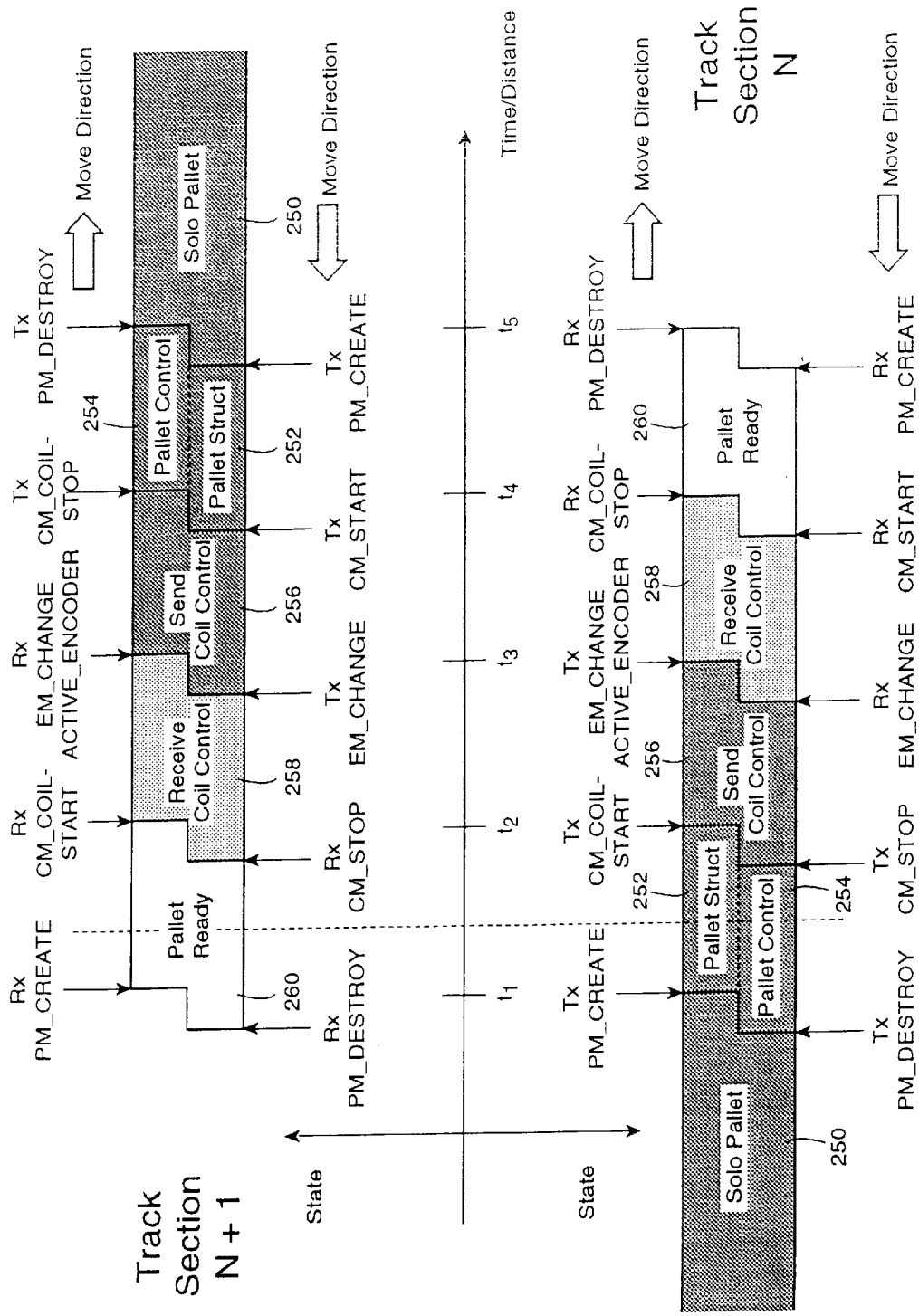
FIG. 14 is a diagram of a preferred scheme for synchronizing the servocontrol systems (each shown in FIG. 9) of adjacent conveyor system sections in order to smoothly control the movement of a pallet thereacross.
Figure 15:
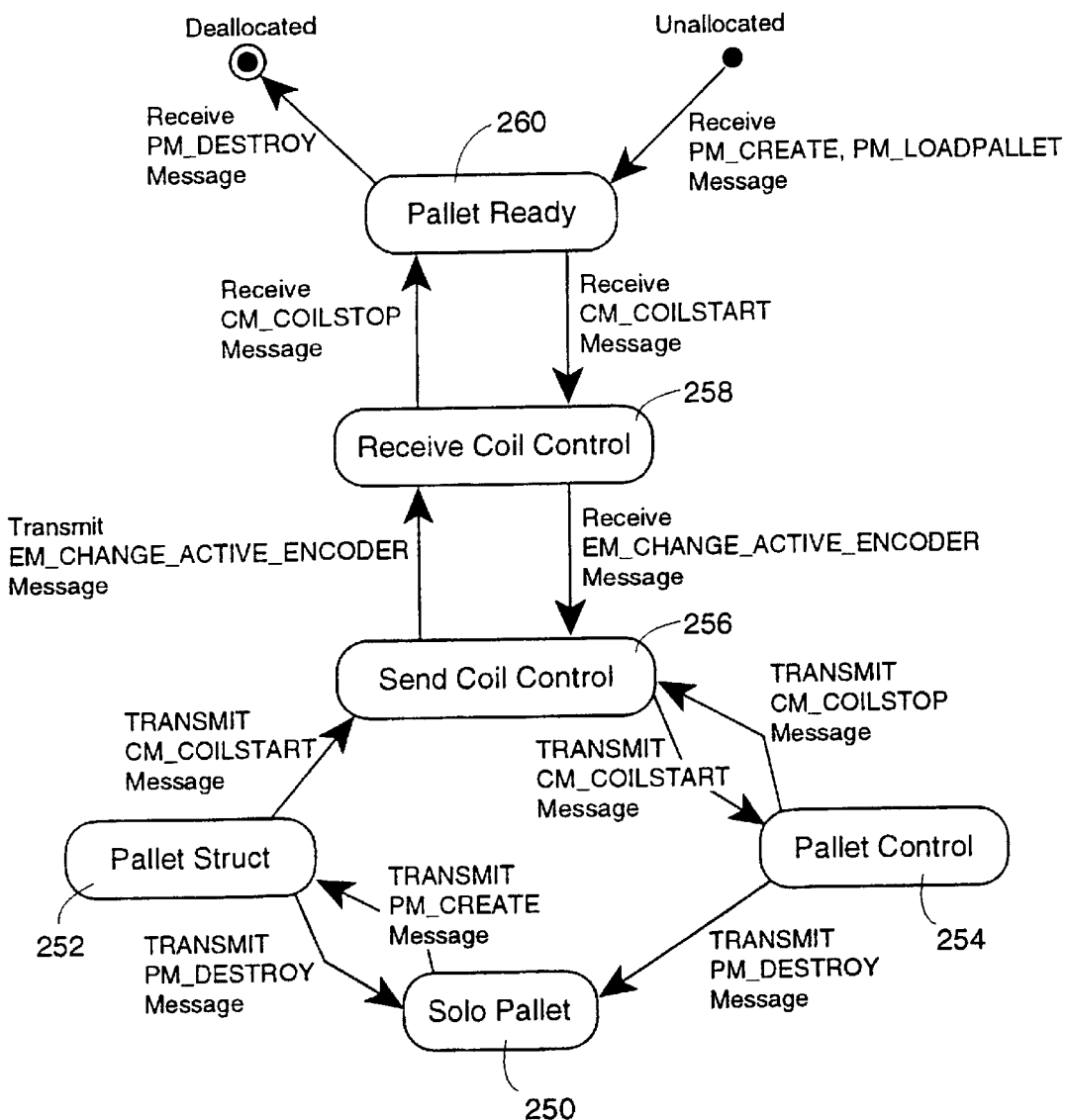
FIG. 15 is a state transition diagram in relation the synchronization scheme of FIG. 14.

FIGS. 14 and 15 depict a method and protocol according to the preferred embodiment for synchronizing the servo control systems of adjacent section controllers and for passing control of a given pallet i crossing control zones. FIG. 14 depicts various control states assumed by section controller(n) of track section or control zone N and section controller(n+1) of track section or control zone N+1 as a given pallet crosses from zone N into zone N+1, and vice versa. FIG. 15 illustrates an associated state transition table followed by each of controller(n) and controller(n+1). A "Solo Pallet" state 250 represents a steady state condition when the given pallet is fully under the control of one section controller.

When the given pallet moves to the right in FIG. 14 from zone N to zone N+1, the leading right edge of the associated reflective strip reaches a point $t_1$ which is considered to be near to zone N+1. Upon the occurrence of this event, a message, termed PM_CREATE, is transmitted by controller (n) to controller(n+1) over the peer to peer communication link 92 using a predetermined handshaking protocol (for ensuring reliable communication), and controller(n) enters a "Pallet Struct" state 252. Correspondingly, controller(n+1) receives the PM_CREATE message and enters a "Pallet Ready" state 260. During the time period $t_1$–$t_2$ represented by the substantially conterminous states of the section controllers, the following events occur: (1) controller(n+1) creates or initializes a data structure for the given pallet; and (2) controller(n) passes various static data from its data structure representing the given pallet to controller(n+1) over the peer-to-peer communications link 92 in accordance with a predetermined communications protocol. This data includes information such as the pallet destination point, current velocity and acceleration, maximum permissible velocity and acceleration, length, number of magnets and offset data, and envelope or buffer space data for collision avoidance purposes.

At point $t_2$, the leading edge of the pallet permanent magnet pole pair 60 reaches the leading turn of a border coil pair located in zone N+1. (See, for example, FIG. 5(*a*).) Upon the occurrence of this event, a message, termed PM_COILSTART, is transmitted by controller(n) to controller(n+1), and controller(n) enters a "Send Coil Control" state 256. Correspondingly, controller(n+1) receives the PM_COILSTART message and enters a "Receive Coil Control" state 258. During the time period $t_2$–$t_3$ represented by the conterminous states of the section controllers, controller(n) is still responsible for executing the position control loop for the given pallet, which includes computing a force set point component $F_i$ for the given pallet and measuring the position $X_i$ thereof. Controller(n) uses this data as described above to regulate the border coil pair 75 in zone N. The force set point $F_i$ and position $X_i$ are also communicated to controller(n+1) at a rate of approximately 1 KHz over the peer-to-peer communication link 92. Controller(n+1) uses this data in its commutation controller 155 and current compensator 184 in order to produce current step point components $I_1$ and $I_2$ in zone N+1 and regulate the border coil pair 75 in zone N+1 so as to properly servocontrol the given pallet. In this manner, controller(n) and controller(n+1) are synchronized to cooperatively execute the current control loop for the given pallet by regulating the border coil pairs in their respective zones.

At point $t_3$, the leading edge of the reflective strip of the given pallet reaches a point, as described above, where the ownership of the given pallet should be handed-off from a border encoder in zone N to a border encoder in zone N+1. Upon the occurrence of this event, a message, termed EM_CHANGE_ACTIVE_ENCODER, is transmitted by controller(n) to controller(n+1), and controller(n) enters the "Receive Coil Control" state 258. Correspondingly, controller(n+1) receives the EM_CHANGE_ACTIVE_ENCODER message and enters the "Send Coil Control" state 256. During the time period $t_3$–$t_4$ represented by the substantially conterminous states of the section controllers, a number of steps occur:

(1) The dynamic or memory-based data used by controller (n) for the position control loop of the given pallet is transferred over to controller(n+1). In the preferred embodiment this comprises (a) the accumulator, I_term; and (b) a portion of the error history buffer E[2 . . . q] in respect of the set $\{\Delta S_i[T-1], \Delta S_i[T-2], \ldots, \Delta S_i[T-q]\}$ of position errors for calculating the derivative term of the p.i.d. control law.

(2) The dynamic or memory-based data used by controller (n) to generate the trajectory of the given pallet is transferred over to controller(n+1). In the preferred embodiment this comprises up-to-date velocity, acceleration, position and time base data.

(3) Controller(n) sends controller(n+1) a message effective to transfer the ownership of the given pallet from the border encoder in zone N to the border encoder in zone N+1. This change of state is also shown in FIG. 13 where, for instance, when the border encoder (enc= 6) is in the "zone 3" state 204 and moves right into a hand-off zone, the border encoder enters into a "Right Hand-off Message" state 216 where the zone-crossing, controller ownership transfer message is transmitted.

(4) Once step (3) is effected, controller(n+1) becomes responsible for executing the position control loop for the given pallet, which includes computing the force set point component $F_i$ for the given pallet and measuring the position $X_i$ thereof. Controller(n+1) uses this data as described above to regulate the border coil pair in zone N+1. Now, controller(n+1) communicates the force set point $F_i$ and measured position $X_i$ to controller (n) at a rate of approximately 1 KHz over the peer-to-peer communication link 92. Controller(n) now uses this data in its commutation controller 155 and current compensator 184 in order to produce current step point components $I_N$ and $I_{N-1}$ in zone N and regulates the border coil pair in zone N so as to properly servocontrol the given pallet. In this manner, controller(n) and controller(n+1) remain synchronized to continue to cooperatively execute the current control loop for the given pallet.

At point $t_4$, the trailing edge of the pallet permanent magnet pole pair 60 passes the last turn of the border coil located in zone N. Upon the occurrence of this event, a message, termed PM_COILSTOP, is transmitted by controller(n+1) to controller(n), whereby controller(n+1) enters into a "Pallet Control" state 254 and controller(n) enters into the "Pallet Ready" state 26. As soon as this point is reached, position control loop set point data is no longer transferred from controller(n+1) to controller(n). Since there is no longer any need to regulate the border coil in Zone N. At point $t_5$ controller(n+1) enters into the steady "Solo Pallet" state, wherein a message, termed PM_DESTROY, is sent to controller(n) to terminate its data structure for the given pallet.

In the preferred method, the point at which any of the above described section controller states is triggered or entered into differs depending upon the direction the given pallet is moving. This provides a hysteresis effect, similar to that described above, for enabling a more stable control system by preventing the inefficient oscillation or flip-flopping between states when a pallet straddles two track sections and is commended to move relatively small distances to and fro.

The above process has been described a tone border between track units. A similar process can simultaneously occur at the opposite border between track units when a pallet travels thereacross.

It will be appreciated by those skilled in the art that while the preferred embodiment passes a position error minimizing signal such as $F_i$ between adjacent section controllers when a pallet crosses control zones, an alternative embodiment may instead compute the current set points for the coil pair in an adjacent control zone which are spanned by a crossing pallet, and pass this data to the adjacent section controller. The current set point signals are linearly related to the position error minimizing set point or signal, and both types of signals can be viewed as instances of coil regulating signals. The advantage of the preferred embodiment is that less information has to be passed over the relative slow (compared to the processing speed of the DSP 105) serial communication link 92.

The preferred conveyor system 20 provides a number of advantages over the herein-disclosed prior art. For instance, the electromagnetic structure of the conveyor system provides relatively smooth thrust production capabilities, and the conveying speed is much improved over typical belt conveyor systems. For example, in a prototype system developed by the applicants, the pallets attained a 2 g acceleration and steady velocity of 2 m/s. In addition, the pallet position-detecting subsystem enables the absolute position of each pallet to be determined at high resolution at all times anywhere along the track, thereby enabling the pallets to be precisely positioned to any point along the track. Furthermore, the preferred distributed control system enables each pallet to be individually and separately controlled yet interface with manufacturing process controllers. Finally, these elements, in combination with the physical structure of the conveyor system, enable it to be constructed out of discrete, self-contained, modular track sections, with little practical restriction on the length of the conveyor system or the number of pallets controlled thereby.

The preferred embodiment has been disclosed with a certain degree of particularity for the purpose of description but not of limitation. Those skilled in the art will appreciate that numerous modifications and variations can be made to the preferred embodiment without departing from the spirit and scope of the invention.

What is claimed is:

1. Apparatus for detecting the position of a moving element relative to a stationary element, said apparatus comprising:
    a plurality of linear encoder readers spaced generally along the stationary element at fixed positions relative thereto;
    a device readable by the linear encoder readers, the readable device being mounted on the moving element and having a length which is greater than the spacing between any given pair of adjacent linear encoder readers;
    a guide for aligning the readable device in order to interact with the linear encoder readers; and
    circuitry, connected to each linear encoder reader, for associating the readable device with only one linear encoder reader in a state of interaction with the readable device at any time and for resolving and providing a reading of the overall position of the moving element based on the fixed position of the associated linear encoder reader and a relative position of the readable device in relation to the associated linear encoder reader.

2. Apparatus according to claim 1, wherein the readable device is an optical strip or a magnetic strip and the linear encoder readers respectively comprise optical read heads or magnetic detectors.

3. Apparatus according to claim 1, wherein the linear encoder readers are substantially equidistantly spaced along the stationary element and the readable device has a length which is greater than the spacing between adjacent linear encoder readers and less than the spacing between three linear encoder readers.

4. Apparatus according to claim 1, wherein, in a condition where the readable device is associated with a given linear encoder reader and simultaneously begins to interact with an adjacent linear encoder reader, the circuitry is operative to switch the association of the readable device with the given linear encoder reader to the adjacent linear encoder reader once the readable device has reached a pre-specified distance through one of the given linear encoder reader and the adjacent linear encoder reader.

5. Apparatus according to claim 4, wherein the circuitry is operative to initialize the adjacent linear encoder reader prior to the interaction of the readable device with the adjacent linear encoder reader.

6. Apparatus according to claim 4, wherein, immediately after the association of the readable device is switched to the adjacent linear encoder reader, the circuitry is operative to require the readable device to backtrack for at least a minimum distance before the association of the readable device is switched back to the given linear encoder reader, to thereby provide a hysteresis effect.

7. Apparatus for detecting the positions of plural moving elements relative to a stationary element, said apparatus comprising:
    a single row of linear encoder readers spaced generally along the stationary element at fixed positions relative thereto;
    a device readable by the linear encoder readers mounted on each moving element, each readable device having a length which is greater than the spacing between any given pair of adjacent linear encoder readers;
    a guide for aligning the readable devices in order to interact with the single row of linear encoder readers; and
    circuitry, connected to each linear encoder reader, for associating any given readable device with only one linear encoder reader at any time and for resolving and providing a reading of the overall position of the corresponding moving element based on the fixed position of the associated linear encoder reader and a relative position of the given readable device in relation to the associated linear encoder reader.

8. Apparatus according to claim 7, wherein the readable device is an optical strip or a magnetic strip and the linear encoder readers respectively comprise optical read heads or magnetic detectors.

9. Apparatus according to claim 7, wherein the linear encoder readers are substantially equidistantly spaced along the stationary element and each readable device has a length which is greater than the spacing between adjacent linear encoder readers and less than the spacing between three linear encoder readers.

10. Apparatus according to claim 7, wherein each moving element is sized longer than its corresponding readable device in order to preclude readable devices of adjacent moving elements from interacting with the same linear encoder reader.

11. Apparatus according to claim 7, wherein, in a condition where a given readable device is associated with a given linear encoder reader and simultaneously begins to interact with an adjacent linear encoder reader, the circuitry is operative to switch the association of the given readable device with the given linear encoder reader to the adjacent linear encoder reader once the given readable device has reached a pre-specified distance through one of the given linear encoder reader and the adjacent linear encoder reader.

12. Apparatus according to claim 11, wherein the processing circuitry is operative to initialize the adjacent linear encoder reader prior to the interaction of the given readable device with the adjacent linear encoder reader.

13. Apparatus according to claim 11, wherein, immediately after the association of the given readable device is switched to the adjacent linear encoder reader, the circuitry requires the given readable device to backtrack for at least a minimum distance before the association of the given readable device is switched back to the given linear encoder reader, to thereby provide a hysteresis effect.

* * * * *